(12) United States Patent
Kessler et al.

(10) Patent No.: US 7,028,434 B2
(45) Date of Patent: Apr. 18, 2006

(54) SPILLAGE CONTROL SAFETY FLOOR MATTING

(75) Inventors: Ronald Kessler, Girard, OH (US); Myron Ullman, Canfield, OH (US); Kim D. Kendall, Massillion, OH (US)

(73) Assignee: Pixterra, Inc., San Jose, CA (US)

( * ) Notice: Subject to any disclaimer, the term of this patent is extended or adjusted under 35 U.S.C. 154(b) by 182 days.

(21) Appl. No.: 10/463,043

(22) Filed: Jun. 17, 2003

(65) Prior Publication Data

US 2004/0019994 A1 Feb. 5, 2004

Related U.S. Application Data

(63) Continuation-in-part of application No. 09/848,530, filed on May 3, 2001, now Pat. No. 6,578,324, which is a continuation-in-part of application No. 09/451,336, filed on Nov. 30, 1999, now Pat. No. 6,405,495, which is a continuation-in-part of application No. 09/090,621, filed on Jun. 4, 1998, now Pat. No. 5,992,105.

(51) Int. Cl.
*H47G 27/02* (2006.01)

(52) U.S. Cl. .............................. 52/177; 52/664; 52/673; 52/591.2; 52/591.4

(58) Field of Classification Search ................. 52/177, 52/662, 664, 673, 591.2, 591.4, 656.9; 15/215, 15/216, 238, 239
See application file for complete search history.

(56) References Cited

U.S. PATENT DOCUMENTS

| | | | | |
|---|---|---|---|---|
| 1,421,818 A | * | 7/1922 | Oakley | 15/215 |
| 3,703,059 A | * | 11/1972 | Kessler | 52/177 |
| 3,808,628 A | * | 5/1974 | Betts | 15/215 |
| 4,087,948 A | * | 5/1978 | Mellor | 52/180 |
| 4,468,910 A | * | 9/1984 | Morrison | 52/591.2 |
| 6,505,444 B1 | * | 1/2003 | Johnson | 52/177 |

\* cited by examiner

*Primary Examiner*—Carl D. Friedman
*Assistant Examiner*—Tiara Robertson
(74) *Attorney, Agent, or Firm*—Robert G. Lev

(57) ABSTRACT

A thin flexible floor mat system is configured to resist penetration by high heeled shoes and be capable of being easily rolled up in long segments. The floor mat is constituted by a series of small square sections and are connected together with connectors that permit easy deployment and removal of the mat system by detaching segments of the mat from each other. The mat is flexible but resists penetration from high heels and other forms of traffic by virtue maintaining of a predetermined amount of flexibility through the use of auxiliary supports. Further stability is provided by one-piece ramp corners.

11 Claims, 8 Drawing Sheets

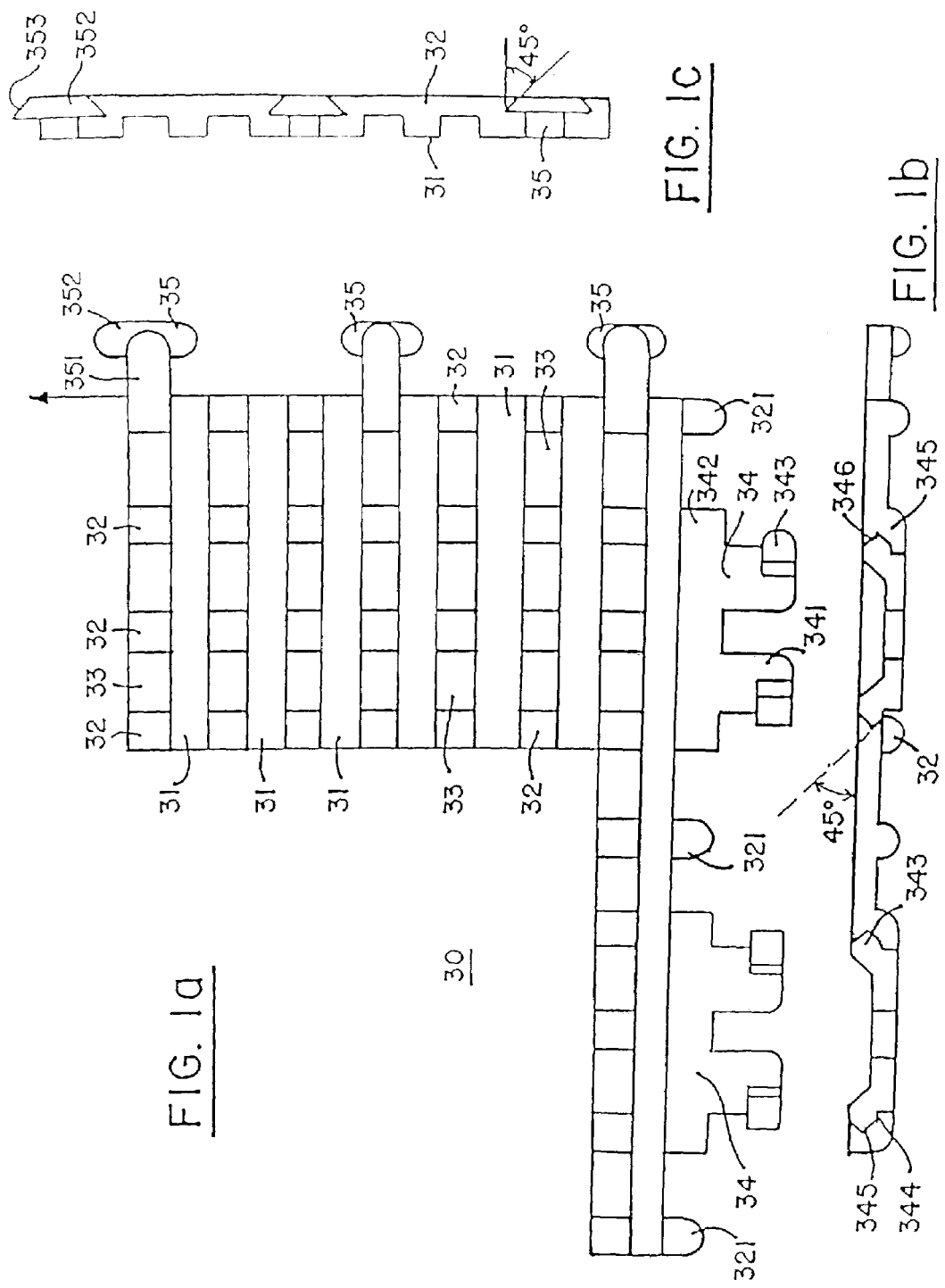

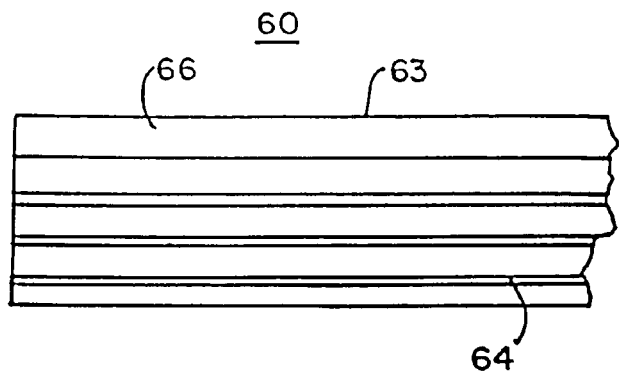
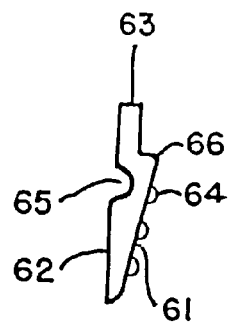
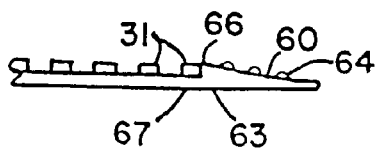
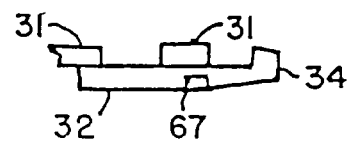
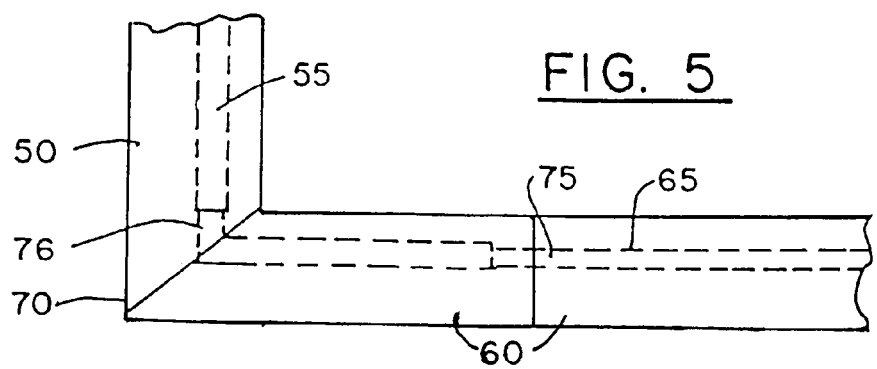

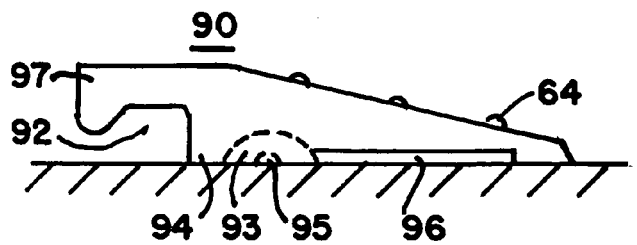
FIG. 8a
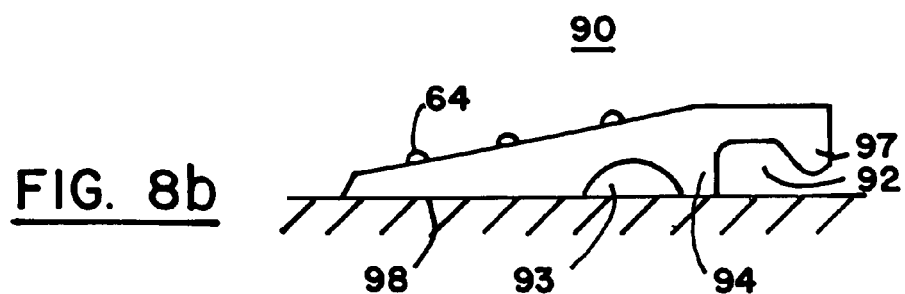
FIG. 8b
FIG. 9a
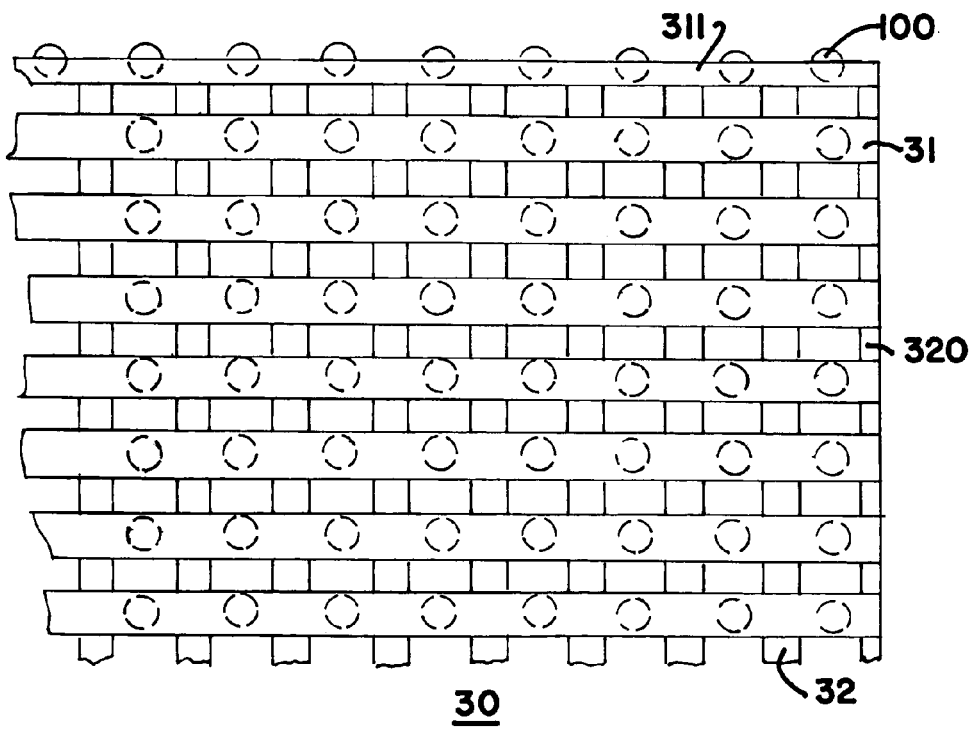

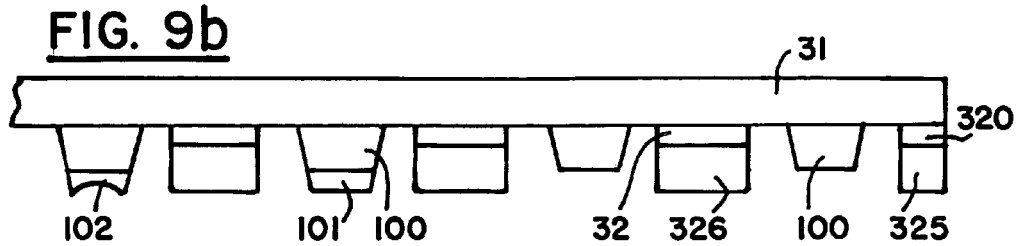
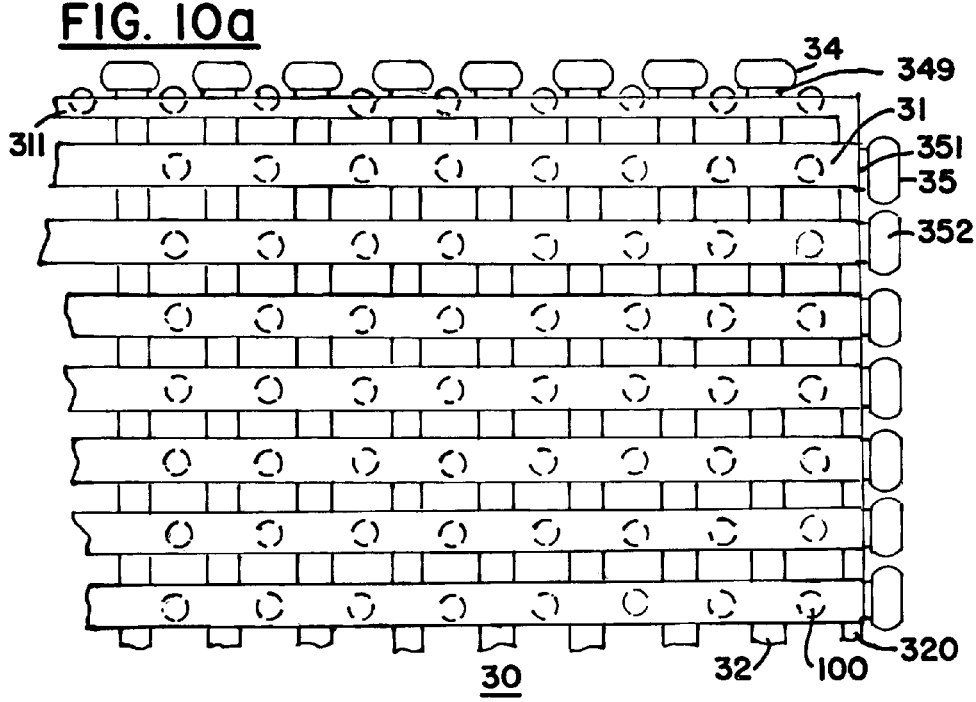
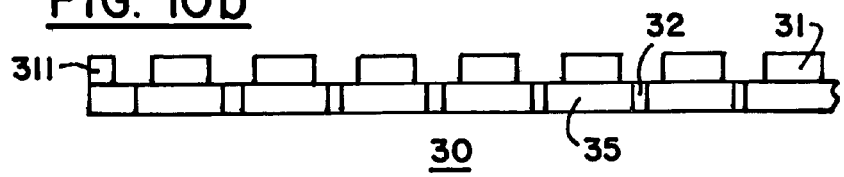
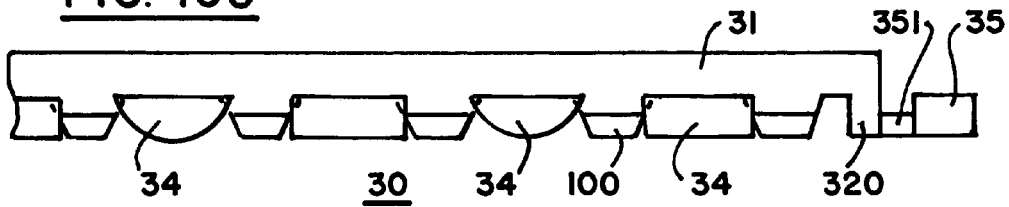

SPILLAGE CONTROL SAFETY FLOOR MATTING

RELATED APPLICATIONS

The present application is a continuation-in-part of U.S. patent application Ser. No. 09/848,530, filed May 3, 2001, now U.S. Pat. No. 6,578,324, issued Jun. 17, 2003, which is a continuation-in-part of U.S. patent application Ser. No. 09/451,336, filed Nov. 30, 1999, now U.S. Pat. No. 6,405,495, issued Jun. 17, 2003, which is a continuation-in-part of U.S. patent application Ser. No. 09/090,621, filed Jun. 4, 1998, now U.S. Pat. No. 5,992,105, issued Nov. 30, 1999.

TECHNICAL FIELD

The present invention relates generally to plastic or rubber floor mats providing a raised, perforated high-friction surface suitable for use in damp locations, such as lobbies, and the like. More specifically the present invention relates to a method for easily removing and deploying various sizes of floor mat systems by connecting and detaching floor mat sections to and from each other.

BACKGROUND OF THE INVENTION

Perforated rubber or plastic floor mats are useful for providing a safe, high friction surface for people and other traffic moving in damp conditions. This is accomplished by keeping the feet of pedestrians above a damp or particulate-rich, cold, encumbered or otherwise slippery floor.

Normally the upper surface of the floor mat is constituted by a number of narrow, parallel plastic or rubber strips or ribs, often separated by a distance approximately the same size as the width of an individual strip. Often such strips or ribs have anti-skid corrugations on their top surfaces to provide a high friction walking surface.

However, in many cases, the anti-skid corrugations on the top surfaces of the upper portion of the floor mat can create additional hazards. For example, the corrugations may hold particulate matter to the surface of the mat rendering the mat far more slippery than a mat with a smooth upper surface. Also, it has been discovered through use that corrugated surfaces do not exhibit as much friction as that provided by flat mats.

This is especially critical with thin mats, which have a tendency to slide when subjected to lateral or horizontal forces caused by traffic. Such forces also tend to pull mat sections away from each other further exacerbating the problem of mat movement. Thus, many thin mats allow hazardous conditions to occur by moving along the floor supporting the mat, even if the traffic across the mat interfaces on relatively slip free surface of the mat.

On the other hand, thicker matting may serve as a trap for high heeled shoes to small casters or wheels of vehicles. Also, the thicker matting (usually ½" inch or more in thickness) is much more difficult to deploy and remove than thinner matting.

The lower portion of a conventional floor mat usually consists of two series of roughly parallel, spaced strips crossing each other at substantially perpendicular directions, and connected together to provide rectangular perforations through the floor mat so that the floor or support surface upon which the mat is laid can easily dry out. Mud and dirt are cleaned from the feet of the users by friction with the upper edge of the mat surface to fall through the perforations to the floor upon which the mat is laid. Such mats are most often used in the lobbies of public buildings, and in damp work situations to keep the feet of workers above a damp floor which can easily become very slick with moisture or debris. The principal purpose of such mats is to enhance the safety of workers or pedestrians passing over a particular surface.

In some cases it is desirable to cover an entire surface of a fairly large area with matting. Since the matting can be fairly heavy or thick, it is often difficult to remove it in order to clean the floor, especially if the mat is in a single large piece. If, on the other hand, the mat is made up of a number of smaller pieces loosely laid on the floor, it is difficult to keep them properly connected and aligned. This is especially true if the floor tends to become slippery when wet, or if the nature of the traffic over the mat is such as to cause horizontal lateral stress along a plane parallel to the floor. As a result of such stress, the mat sections may move about creating a hazardous situation, as well as an unsightly appearance.

A number of systems have been proposed to hold floor mat section together. The best-known technique is to use small sections of matting that are glued to each other. However, in this system it is very difficult to remove the matting without breaking the glue bonds and causing damage to the matting. If the glue bonds are sufficiently strong that the mat portions holds together, then the previously-mentioned problems of dealing with large, heavy mats occur.

Another solution has been the use of connecting devices permanently affixed to the floor, and having projecting connecting portions, such as prongs. These are generally known as dog ears, and are forced over the ribs of the floor mats to secure the matting to the floor. However conventional systems using this technique have been hampered by difficulties in attaching and detaching the mat sections to each other and the floor.

Another system for holding mats together is found in U.S. Pat. No. 3,703,059 to Kessler, dated Nov. 21, 1972, and incorporated herein by reference. This system discloses a system for interlocking small floor mats at their edges to provide a single large mat which can be treated as a unit if desired. The system accommodates removal of small floor mat sections for cleaning, as well as replacement of selected floor mat sections. This is accomplished using plastic connectors having locking portions which fit into apertures in the floor mat, and engage both the upper and lower strips or ribs of the mat to lock the mat sections together.

Despite the advantages of the system disclosed in U.S. Pat. No. 3,703,059, substantial problems with the assembly of large mat configurations still exist. The connectors of the Kessler system can be difficult to install so that easy mat alignment will also be difficult. Another factor occurs when long lengths of floor matting are assembled. Traffic along the length of the floor mat creates stresses which tend to pull the mat sections apart, even with the conventional locking system. Further, the locking splines of the Kessler system are subject to rolling allowing the floor mats to separate when certain stresses (caused by traffic) are applied to it. This is further exacerbated by the fact that there are substantial portions of adjoining floor mat sections that are not directly connected by the locking splines. Thus, high levels of traffic, or increased speeds of the traffic, as well as local high stress conditions (such as those caused by high heeled shoes or extremely heavy individuals) can cause mat destabilization and separation.

Another solution to the aforementioned problems associated with floor mats is the use of recessed areas formed in the floor to contain the floor mats. Generally, the recessed areas are sized so that the floor mats are located with their edges against the edges of the recessed area thereby preventing the floor mats from sliding when subject to traffic. Ideally, water, snow, liquid detergent, granulated detergent, auto oil, granulated products, and other debris from the sources of traffic pass through the perforations in the mat to keep the top surface of the mat free of standing water and other hazards. Since the top surface of the mat is generally flush with the surrounding surfaces, the mat does not constitute an obstruction. This is especially important when using relatively thick or rigid mats.

While such conventional mat arrangements are adequate for many purposes, there are certain drawbacks. First the building owner or user must plan for the installation of these mats and have the recessed area built into the floor during construction of the building. As a result, additional burdens are created in the planning of the building. In the alternative, the recessed areas can be dug out of the floor after the building has been constructed. However, such operations entail a great deal of expense to the building owner or user. Further, even when a recessed area has been provided to hold the floor mats, extemely large mats may still be moved within the recessed area, possibly causing unsafe conditions.

Another approach includes the use of continuous lengths of matting arranged in roles. However, the rolled matting can be cumbersome to move for cleaning, etc. Also, conventional connections between large sections of matting are often difficult to easily install or disconnect. Consequently, in conjunction with the weight of the matting, awkward conventional connector usually make the deployment and the removal of large sections of matting a long and arduous process.

One approach to the problem of heavy and awkward rolls of matting is to use thinner matting material (generally in the range of 0.25 inch or less). However, one drawback with matting thin enough to be easily rolled is the tendency to be substantially deformed by local stress such as that caused by high heeled shoes, extremely heavy individuals or heavily loaded carts with small casters. Because of the flexibility of thin, conventional, rollable matting, it is common for high heeled shoes to cause deformation of the matting and become stuck in the perforations. As a result, thin, conventional, rollable matting may create additional safety hazards even as it is addressing the usual problems of installing and removing large rolls of matting.

Also, by avoiding the complications of floor recesses dedicated to hold floor matting, another disadvantage occurs. The edge of the floor matting is often constituted by a 90° step, which can constitute a hazard to pedestrian traffic, as well as providing some difficulty for heavy small wheeled vehicles or other vehicles with casters. Conventional solutions to the problem are awkward and add a level of complexity, making deployment and removal of the matting even more complex.

Thus the conventional art does not adequately address all the difficulties of deploying and removing substantial amounts of floor matting.

SUMMARY OF THE INVENTION

It is one object of the present invention to provide a floor mat interlocking system that is easily assembled and removed.

It is another object of the present invention to enhance continuity of connected floor mat sections by means of the weight of traffic moving over the mats.

It is a further object of the present invention to provide a floor mat system that is not destabilized by the movement of traffic over the mat.

It is an additional object of the present invention to provide a floor mat interconnection system that does not allow unintended separation of adjoining mat sections, or unintended mat movement or lifting of the mat from the floor.

It is still a further object of the present invention to provide a system to maintain floor mat alignment.

It is yet another object of the present invention to provide a floor mat system in which individual sections of the mat are easily removed and replaced without disrupting any other sections of the mat.

It is again a further object of the present invention to provide a floor mat that can be easily deployed or removed by being rolled up in sections.

It is also another object of the present invention to provide a sectionalized floor mat that can be connected together with easy snap-fit connectors.

It is still another object of the present invention to provide a floor mat system having the benefits of a floor mat system arranged in floor recesses without the disadvantage of constructing floor recesses.

It is yet a further object of the present invention to provide a floor mat system that avoids the drawbacks of a sharp step between the floor and the top of the mat.

It is again another object of the present invention to provide a floor mat system that admits to easy arrangement of both intermediate and end pieces along the length and width of the mat.

It is still an additional object of the present invention to provide a large continuous rollable floor mat that is constituted by a series of much smaller sections connected to each other.

It is yet another object of the present invention to provide a floor mat configuration that resists penetration by high heeled shoes or other high stress incidents of traffic over a flexible floor.

It is again a further object of the present invention to provide a floor mat configuration that deals with excessive unit load transmitted by wheels without substantially deforming the mat or moving it.

It is still another object of the present invention to provide a floor mat configuration that distributes spillage so that there is no overflow onto the surface of the mat system.

It is yet another object of the present invention to provide a floor mat system that can maintain safe conditions by accommodating spillage of liquid and particulate matter such as detergent, plastic and rubber grains, metal particles, and organic particulate matter such as sugar, and other debris, as well as motor oil and other viscous materials.

It is an additional object of the present invention to prevent or limit warping of a floor mat along it's length.

It is again a further object of the present invention to prevent dimpling along the length of a mat section.

It is still a further object of the present invention to compensate for variations in size due to thermal factors along the length of a floor mat.

It is yet an additional object of the present invention to provide a floor mat system that achieves the benefits of a hard upper surface and a soft anti-slip lower surface while being simple to manufacture.

It is still a further object of the present invention to provide a floor mat system in which both lateral and longitudinal ramps help hold the matting system to an underlying surface.

It is again another object of the present invention to provide a floor mat system having lateral and longitudinal ramps that do not separate at the intersection of the longitudinal and latitudinal ramps.

It is yet an additional object of the present invention to provide a safety floor mat system that can control deformation up to a predetermined point without deforming any further.

It is also another object of the present invention to provide a connector for mat sections, which is sufficiently adaptable to be placed in a variety of different configurations to hold mat sections together.

It is yet a further object of the present invention to provide a floor mat system in which lateral and longitudinal ramps are identical in construction so as to simplify the overall floor matting system.

It is again another object of the present invention to provide a safety floor matting system having improved connection mechanisms for both longitudinal and latitudinal ramps so that both types of ramps are easily connected and disconnected from the floor mat segments.

It is again a further object of the present invention to provide a safety floor matting system with optimized space between upper and lower ribs, as well as optimum shapes and configuration of those ribs to maximize the anti-slip safety aspects of the mat system.

It is still another object of the present invention to provide a mat system having an inclined ramp system surrounding it where the intersections between ramps are not vulnerable to separation.

It is yet an additional object of the present invention to provide a floor mat system having a gripping mechanism in the form of optimal lower rib shape and configuration.

It is also another object of the present invention to provide an auxiliary support technique for a floor mat system whereby the support system provides additional anti-slip capability to prevent the floor mat from moving laterally on the support surface.

It is still a further object of the present invention to provide a safety floor mat system which can be firmly attached to the floor or surface supporting the floor mat.

It is again another object of the present invention to provide a safety floor mat system that can be arranged to withstand high lateral forces without substantial movement, and without being permanently affixed to the floor or support surface.

It is yet a further object of the present invention to provide a safety floor mat system having ramps where connection between the ramp segments are arranged so that breaks between the ramp segments are eliminated.

It is again another object of the present invention to provide a safety floor mat system in which anti-skid devices are easily retrofitted to existing floor mats.

It is still a further object of the present invention to provide a safety floor mat system which is easily connected to permanent floor connectors, and easily disconnected.

These and other objects of the present invention are achieved by a mat system arranged on a support surface to provide a dry, relatively unencumbered travel surface. The mat system includes at least one mat section. The mat sections include a plurality of upper strips having upper and lower surfaces, and a plurality of lower strips having upper and lower surfaces arranged so that the upper surfaces of the lower strips are permanently affixed to the lower surfaces of the upper strips. A ramp structure is also included and is constituted by a plurality of ramps arranged around the periphery of the mat system. The ramp structure also includes at least corner piece joining at an intersection to two different ramps extending from two different edges of the mat system. The corner piece of the ramp is constituted by a single unitary molded structure.

In another embodiment a mat system is arranged on a support surface to provide a relatively unencumbered dry travel surface. The mat system includes at least one mat section. The mat section includes a plurality of upper strips having upper and lower surfaces and ramp connections extending therefrom. A plurality of lower strips having upper and lower surfaces are arranged so that the upper surface of the lower strips are permanently affixed to the lower surfaces of the upper strips. A plurality of the lower strips have ramp connections extending therefrom. The ramp connections for the upper strips and ramp connectors for the lower strips are identical in structure. The ramp structure is also included to be arranged at the periphery of at least one of the mat sections, and connects the ramp connectors of the upper strips and the ramp connectors of the lower strips.

Yet another embodiment of the present invention is manifested by a mat system arranged on a support surface to provide a relatively dry, unencumbered travel surface. The mat system includes at least one mat section and comprises a plurality of upper strips having upper and lower surfaces and a plurality of lower strips having upper and lower surfaces arranged so that the upper surfaces of the lower strips are permanently affixed to the lower surface of the upper strips. A ramp structure is also attached along the periphery of the mat sections. The mat is configured so that the upper strips are parallel to each other and lower strips are parallel to each other. The upper strips are arranged perpendicular to a longitudinal direction of traffic along the mat system, and the lower strips are arranged substantially perpendicular to the upper strips. The spacing between all the strips is uniform so that minimum spacing between the upper strips is 0.07 inches and the minimum spacing between the lower strips is 0.1 inch.

Yet another embodiment of the present invention is manifested by a mat system arranged on a support surface to provide a relatively dry, unencumbered travel surface. The mat system includes at least one mat section and each of the mat sections includes a plurality of upper strips having upper and lower surfaces and a plurality of upper strips, having upper and lower surfaces. The lower surfaces of the upper strips are arranged to be permanently affixed to the upper surfaces of the lower strips. At least some of the lower strips are substantially rectangular in shape and contain an anti-slip device.

Still an additional embodiment of the present invention is manifested by a mat system arranged on a support surface to provide a relatively dry, unencumbered travel surface. The mat system includes a plurality of upper strips having upper and lower surfaces, and a plurality of lower strips having upper and lower surfaces. The upper surfaces of the lower strips are permanently affixed to the lower surfaces of the upper strips. Also included is a plurality of auxiliary supports arranged on the lower surface of the upper strip, and extending downward from the lower surface of the upper strips towards the support surface.

Yet a further embodiment of the present invention is manifested by a mat system arranged on a support surface to provide a relatively dry, unencumbered travel surface. The mat system includes at least one mat section, which in turn includes a plurality of upper strips having upper and lower surfaces. Each mat section is also constituted by a plurality of lower strips having upper and lower surfaces arranged so that the upper surfaces of lower strips are permanently affixed to the lower surfaces of the upper strips. The mat sections are held together by at least one connector, which is constituted by a softer material than the material constituting the upper surfaces of the upper strips of each of the mat sections.

BRIEF DESCRIPTION OF THE DRAWINGS

FIG. 1(a) is a top view diagram of the mat system, including connectors of the present invention.

FIG. 1(b) is an end elevational view diagram of FIG. (a) depicting the longitudinal connectors of the present invention.

FIG. 1(c) is a side elevational view diagram of FIG. 1(a) depicting the latitudinal connectors of the present invention.

FIG. 4(a) is a top view diagram of a latitudinal ramp structure running along the width of the mat.

FIG. 4(b) is a side view diagram of FIG. 4(a).

FIG. 4(c) is a side view diagram depicting the interface between the latitudinal ramp of FIG. 4(b) and an edge of the mat.

FIG. 4(d) is a side elevation view diagram of a lateral edge of the mat with a longitudinal connector depicting a notch for accommodating the latitudinal ramp.

FIG. 5 is a top view depicting a miter joint between latitudinal lamp and a longitudinal ramp.

FIG. 8(a) is a side view of the ramp structure of FIG. 7.

FIG. 8(b) is a side sectional view taken along lines 8-A of the ramp structure of FIG. 7.

FIG. 9(a) is a top view of another embodiment of the inventive floor mat structure.

FIG. 9(b) is a side view of the floor mat structure of FIG. 9(a).

FIG. 10(a) is a top view of a further embodiment of the inventive floor mat.

FIG. 10(b) is a side view of the floor mat structure of FIG. 10(a) taken in a first direction.

FIG. 10(c) is a side view of the floor mat structure of FIG. 10(a) taken from a second direction.

DETAILED DESCRIPTION OF THE PREFERRED EMBODIMENTS

The present invention is a modification of the floor mats disclosed in U.S. Pat. No. 3,703,059, and incorporated herein by reference. U.S. Pat. No. 3,703,059 needs no further elaboration for purposes of understanding the present invention.

Figure 2A:
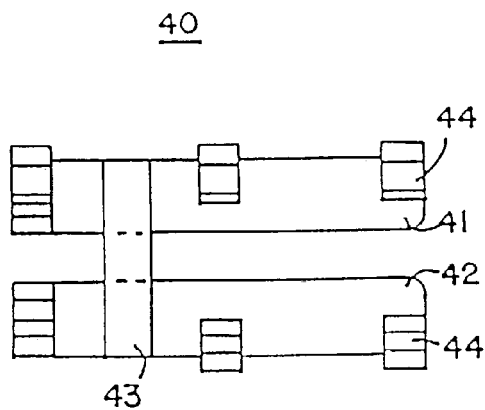
FIG. 2(a) is a top view diagram of an easy-release/lock connector of the present invention.

While the present invention can encompass various spacing configurations between the upper and lower mat strips or ribs, the first embodiment of the present invention is preferably practiced with a uniform size for upper and lower mat strips, as well as uniform spacing between both the upper and lower strips. The second and third embodiments of the present invention reside in the distinctive longitudinal and latitudinal connectors depicted in FIGS. 1(a)–1(c). The fourth embodiment of the present invention resides in an easy-lock/release longitudinal connector depicted in FIGS. 2(a)–2(c), and which is used to hold together long segments of matting, usually kept in separate rolls. The fifth and sixth embodiments of the present invention, as depicted in FIGS. 3(a)–3(b) and 4(a)–4(d), respectively, reside in longitudinal and latitudinal ramp structures that avoid the problems inherent when a mat terminates in a sharp step configuration.

The novelty of the first embodiment of the present invention resides in the exact relationship of strip width, height and the spacing between them. To best understand the structure and functionality of the first embodiment of the present invention, reference is made to FIGS. 1(a)–1(c). Floor mat 30 in FIG. 1(a) can be of any size for the first embodiment of the invention. However, preferably such mats are in 2 foot by 2 foot sections that are easily assembled (and disassembled) with other mat sections to form large area floor mats. The mat is constructed of upper strips or ribs 31 and lower strips or ribs 32 running perpendicular to ribs 31 and beneath them. The dimensions and proportions can change based upon the requirements of a particular mat system.

Since the mat is configured so that the lower ribs or strips 32 run continuously in the direction of traffic, a series of conduits between these ribs are formed to allow spillage to travel away from its original point of the spill. As a result, the spilled material spills out over the floor beneath the mat, and does not rise to the level of the upper strips 31 to create a hazard. These conduits are arranged to be continuous over the entire length of the mat, allowing the spillage to spread evenly over the floor beneath the mat. In order to facilitate these continuous conduits, the mat is preferably formed in a continuous length. To facilitate easy removal of the matting so that the floor beneath can be cleaned, the mat material must be sized (preferably 0.25 inch) so that the mat can be rolled up. Extremely long sections of mat can be spit up so as to be rolled up in separate coils. The matting of the separate coils is connected to that of other coils using the easy-release/lock connector of FIGS. 2(a)–(d).

The continuous conduit formed by the lower ribs or strips 32 need not always be in the direction of traffic. Instead, they can be perpendicular to the direction of traffic so that the upper strips 31 run parallel to the direction of traffic. However, in this application for ease of providing a clear description through the use of maintaining a constant orientation, the lower strips are described as extending parallel to the direction of traffic on the mat system. Further, while the mat system is preferably configured to have the upper and lower strips perpendicular to each other, this is not absolutely necessary to practice the present invention. Rather, the upper strips can be arranged at an angle other than 90° to the lower strips. Further, neither the upper strips or the lower strips are necessarily arranged in parallel, although this is the configuration of the preferred embodiment. Rather, the upper strips may form virtually any pattern with respect to each other as long as sufficient space is retained for spillage to drain out through the upper strip and the pattern results in a safe walking surface. The lower strips must be maintained in an arrangement to constitute the necessary conduits over the length of the mat system thereby allowing spillage to spread evenly over the floor and not constitute a hazard by overflowing a top portion of the mat due to containment of the spillage.

While the rib configuration of the present invention can be irregular, the ribs or strips 31,32 are preferably all of uniform thickness and width. Also, the spacing between all of the strips is uniform and is equal for both upper and lower strips. A uniform arrangement of the ribs or strips 31, 32 allows the first preferred embodiment of the present invention to be practiced most easily. Preferably the matting material is of thermoplastic. However, other plastic materials can be used as long as they are sufficiently flexible. The matting can also be formed of rubber although rubber is not the best material in which to configure the mat to have the best advantages offered by the present invention. Consequently, the preferred embodiment of the present invention utilizes plastic, and is preferably grey in color.

The strip arrangement depicted in FIG. 1(a) more clearly depicts the functional relationship of the first preferred embodiment of the present invention. In particular, block 33 represents the space between a pair of lower strips 32 and a pair of overlying upper strips 31. This volume of space labeled 33 in FIG. 1(a) is bounded vertically by the upper surface of the upper strips 31 and the lower surface of the lower strips 32 (the floor on which the mat rests). Horizontally, volume 33 is bounded on two sides by the facing surfaces of two upper strips 31, and on the two other sides by the two facing surfaces of a pair of horizontal strips 32. Thus, volume 33 is a cube of space defined by the top and bottom of the mat and a pair of lower strips as well as a pair of overlying upper strips. It has been determined that if the volume of space defined in perforation 33 is between 0.02 and 0.03 cubic inches, a mat approximately 0.25 inch in thickness will be supported by the floor and thus, will only slightly deform under local pressure caused by traffic such as cart wheels or high heeled shoes. This deformation will not be sufficient to enlarge the perforation and permit a high heeled shoe to become wedged in the perforation. Nor will there be any tendency for the mat to "ball-up" or otherwise move about on the floor due to high local loads.

It is to be noted that while it is necessary to maintain the spacing of upper and lower strips 31, 32 so as to maintain a volume between 0.02 and 0.03 cubic inches, a perforation size that permits easy entry by a high heeled shoe is to be avoided even if the volume range of the perforation is being maintained. This is true for any thickness of mat but becomes more of the problem for matting material approximately 0.5 inch or thicker since the greater thickness of the mat tends to trap the high heel far more firmly than is possible with a thinner mat.

There are additional problems when a mat becomes greater than 0.25 inches in thickness. In particular, such a mat, for example 0.5 inch thick, is very difficult to roll up into a manageable coil, even if only limited lengths are being used. The arrangement of the present invention permits upper and lower strips of different dimensions, thicker or more narrow strips and different shapes for the space defining the volume of perforation 33. Further, it is not necessary that the arrangement of the strips, either upper or lower be uniform. Rather, the arrangement can be that depicted in FIG. 1, as long as the largest perforation maintains a volume of 0.02–0.03 cubic inches.

In the first preferred embodiment of the present invention as depicted in FIGS. 1(a)–1(c), the thickness of both upper and lower individual strips 31,32 is approximately 0.12 inch, while the width of both upper and lower strips is approximately 0.25 inch. The spacing between both the upper and lower strips or ribs can be any value whereby the volume of a perforation 33 is maintained between 0.02 and 0.03 cubic inches, but in the preferred embodiment is the same as the width of the strips. Another constraint is that the mat must be thin enough (approximately 0.25 inch or less) to allow the mat to be rolled for easy removal and redeployment. Consequently, the thinner that the mat is made, the less space that can be allowed between both the upper and lower strips.

Label 34 in FIGS. 1(a) and 1(b) identify longitudinal connectors. The label 35 in FIGS. 1(a) and 1(c) refer to latitudinal connectors. The longitudinal connectors connect mat sections along the length (direction of traffic) of the mat system. The latitudinal connectors connect mat sections together along the width of the mat system. The example depicted in FIGS. 1(a)–1(c) include longitudinal connectors on one edge only and latitudinal connectors on one edge only. However, the embodiments of the present invention that includes the subject longitudinal and latitudinal connectors can be practiced using virtually any combination of such connectors on the mat sections. For example, mat sections can be provided that have no connectors while other mat sections can be provided having connectors on all four edges. Just as the size of the mat sections can be changed from the preferred 2 foot by 2 foot dimensions, so can the number and spacing of both the longitudinal and latitudinal connectors (34,35).

Preferably the 2 foot by 2 foot sections are integrally molded or formed to include at least one type of connector (34,35). In another variation, both types of connectors can be formed on each 2 foot by 2 foot mat section. Then the connectors on each section are cut off where appropriate in order to form the desired mat configuration. This method of integrally forming the longitudinal and latitudinal connectors two separate mat sections provides the most efficient and most flexible approach to creating a wide variety of different mat configurations.

While either or both of the connectors (34,35) can be molded as part of a mat section in the preferred embodiment, they can also be bonded to the mat by an adhesive or any other means known to those skilled in this art. One such technique is to bond two pieces of plastic using solvent applied to the areas where bonding is desired. Further, the connectors 34,35 can be connected to the mat by means of any number of different mechanical arrangements. One example of a mechanical connection is depicted in FIG. 2(a)–2(d), as described infra. In this variation, both longitudinal and latitudinal connectors are made of the same material as the mat (preferably plastic). However, if formed separately, the longitudinal and latitudinal connectors can be made of any other suitable material, such as nylon, rubber, plastic, etc.

The longitudinal connectors 34 extend along the plane of the lower strips or ribs 32 and are of uniform thickness in order to facilitate a smooth transition between mat sections. The longitudinal connector consists of two support feet 341, each having a single connecting prong 343 extending upward and outward from the support feet as depicted in the cross section view FIG. 1(b). The support feet are connected to the main body of the mat section by spacer piece 342. The spacer also has the same thickness as the lower ribs or strips 32 in order to provide a smooth transition between mat sections. When the longitudinal connector is not formed as part of a mat section, the bonding between the longitudinal connector and the mat section occurs between the spacer 342 and the ends of the lower ribs 32 and the bottom of upper ribs 31. The spacer is preferably the same thickness as an upper strip so as to space the upper strips 31 of two adjoining mat sections the proper distance from each other.

The support feet 341 extend under the first upper strip of an adjoining mat section. Each support foot extends between a pair of lower strips on the adjoining mat section, and the pair of support feet is arranged on either side of a single lower strip of the adjoining mat section. Thus, the longitudinal connector 34 interfaces with three lower strips 32 of an adjoining mat section. When connecting to an adjacent mat section the two support feet straddle and fit closely along a first lower rib or strip 32 of an adjoining mat section. Connecting prongs 343 extend over the two adjacent lower ribs on either side of the first rib of the adjacent mat section.

Each connecting prong 343 has a first lower surface 344 formed in virtually the same plane as the top of a lower rib 32, and meant to fit snugly thereover. A second lower surface 345 is formed at an approximate 45° angle to the first lower surface to facilitate easy removal of one mat section from another. The 45° angle allows moderately easy movement between the connecting prong and the lower rib that is held by the connecting prong when the adjacent mat section is lifted from the mat section to which the longitudinal connector is bonded. This arrangement provides a relatively easier release than would occur if the entire bottom surface of connecting prong 343 was formed of a surface parallel to the top surface of the lower rib 32.

The connecting prong 343 has an angled upper surface 346 which is formed at a 45° from horizontal. This 45° angle permits easier connection between the mat sections by allowing the lower rib of an adjacent mat section to slide more easily over the connecting prong into the locked position with the connecting prong held firmly over the top surface of an adjacent lower rib.

In the alternative, if larger mat sections are desired, they can be permanently formed by bonding the longitudinal connectors 34 to the adjacent mat sections. This can be done by means of adhesive solvent bonding or even welding the rubber or plastic material.

Preferably each longitudinal connector 34 spans a distance sufficient to interact with three adjacent lower ribs of an adjacent mat section. The longitudinal connectors are spaced from each other on center lines approximately 2.62 inches, and extend approximately 1.3 inches from the opposite tips of the two connecting prongs 343. However, these dimensions are exemplary only and can be modified to suit any particular mat system in which the longitudinal connectors are to be applied.

Normally the longitudinal connectors 34 span a width of 3 lower strips or ribs 32, and are separated from each other by a lower strip and two of the normal spaces between lower ribs. However, this spacing is not mandatory to practice the present invention, and can be increased at the discretion of the mat designer. Likewise, the space from the center line of the longitudinal connector 34 is indicated in the preferred embodiment as being 2 inches from the edge of the mat. This spacing is not required to practice the present invention. However, the indicated length of the longitudinal connector is necessary to permit the longitudinal connector to be placed as close to a lateral edge of the mat as possible.

The longitudinal connectors 34 can be permanently connected to adjacent mat sections by using adhesive or solvent bonding, as well as any other technique known to those skilled in the plastic forming art. However, such additional support feet 341 of the longitudinal connector. In an alternative embodiment, the support feet are spaced so that it must crimped to fit between the lower ribs 32 of an adjacent mat section. The nature resilience of the plastic material constituting the support feet to exert an outward pressure against the lower ribs of the adjacent mat section thereby providing a strong mechanical bond that is not easily loosened unless the bottom of the mat is exposed so that the parallel feet can be compressed to release its grip on the lower strips of the adjacent mat section. While this mechanical bond functions well enough to allow adjacent mat sections to be firmly connected together without the use of adhesives or other bonding methods, applying mechanical force to press each pair of support feet can be somewhat problematical when assembling the mat. In order to apply the force properly, the bottom of the mat must be exposed so that force can be applied directly to the parallel support feet, preferably with a pair of plyers. Ultimately, this would entail lifting up large mat sections, which could prove awkward. Consequently, the mechanical connection is generally considered a permanent bond between mat sections. When such an arrangement is used, the longitudinal connector is preferably molded as part of an overall mat section, rather than connected by adhesive or some other method.

Rib stubs 321 extend from the lower ribs 32 the same distance as the thickness of the spacer piece 342. This is done to allow a smooth transition between adjacent mat sections and those areas not occupied by the longitudinal connectors 34. The spacing provided by these stubs also facilitate a more precise fit between mat sections. The stubs can be formed by cutting sections of mat when longitudinal connectors are bonded to the edge of the mat. On the other hand, these stubs can be formed as part of the molded structure of the mat section.

FIGS. 1(a) and 1(c) depict a top view and side cross sectional view, respectively, of the latitudinal connectors designated by 35. Each lateral connector has a support piece 351 and a connecting prong 352. This connecting prong is formed to the bottom surface of the support piece and positioned so that the bottom surface of the connecting prong is coplanar with the floor upon which the mat system rests. The top and bottom surfaces of connecting prong are connected by a smooth lateral surface 353. As depicted in FIG. 1(c), the upper surface of the connecting prong is larger than the lower surface so that the lateral surface is formed at angle of approximately 45° to 60 from the vertical (the plane of the floor). This angle allows the latitudinal connector 35 to be more quickly and easily installed when putting mat sections together. Thus, connection operation are easily carried out by placing two mat sections together, positioning the lateral connectors over the space between upper strips or ribs 31 of an adjacent mat section and stepping on the latitudinal connectors to force them between adjacent upper ribs so that the connecting prongs lock beneath the adjacent upper strips on either side of the support piece holding the connecting prong.

The support piece 351 can be bonded to its respective mat section with an adhesive or solvent attaching one end of the support piece between two adjacent upper strips and over the lower strip 31 positioned at the edge of the respective mat from which the latitudinal connector extends. However, in the preferred embodiment, the latitudinal connector 35 (as well as the longitudinal connectors 34) are formed as part of the overall mat section.

As depicted in FIGS. 1(a) and 1(c), the latitudinal connectors 35 are spaced apart by three upper strips 32. The latitudinal connector arranged closest to the longitudinal edge of the mat, is spaced at about 0.87 inch from the edge. The separation between the center line of the latitudinal connectors is approximately 1.5 inches along the entire length of the mat section. As further depicted in FIG. 1(a) the latitudinal connector extends approximately 0.25 inch from the latitudinal edge of its mat section to the inner edge of the connector on the width of the rib 32 of an adjacent mat section.

When connecting to an adjacent mat, the support piece 351 extends over a lower strip 32 of an adjacent mat section while the connecting prong 352 is placed on the interior side of the subject lower strip 32 and in the same plane while extending beneath two adjacent upper strips 31 that straddle the support piece. Mat sections can be held together latitudinally using only the mechanical forces created by the arrangement of the latitudinal connector. In the alternative, mat sections can also be bonded to each with adhesive or solvent along various portions of the latitudinal connectors to make the connections between mat sections permanent. The mechanical locking is facilitated by the support piece which is the same thickness as the upper strips 31 and of the same width as the space between the upper strips. The connecting prong is the same thickness as the lower strips 32 so that the bottom of the connecting prongs lie flat on the floor along with the bottom surface of the lower strip or rib. This close fit facilitates the strong mechanical connection between two mat sections in the latitudinal direction of the mat system.

The floor mats can be cut or molded so that both types of connectors 34,35 are arranged in alternating manner on adjacent mat sections. Normally the longitudinal connectors 34 are spaced at such a distance that complementary connectors (from adjacent mats) could not fit between two of them. However, the present invention can accommodate different spacing of these connectors so as to permit a complementary longitudinal connector from an adjacent mat section to fit between a pair of longitudinal connectors on the first mat. In order to accomplish this, a mat sections would have to be molded and then adjusted (by cutting or bonding connectors) so that the alternating connectors would fit between each other on adjacent mat sections. In the alternative, special molds can be made of complementary mats so that two such mat sections could always fit together without cutting or other adjustment.

As previously indicated, it is desirable for mat sections to be connected together both latitudinally and longitudinally with respect to the direction of traffic on the mat. One advantage of making the connections between mat sections permanent by means of adding adhesives to the longitudinal and latitudinal connectors (34,35) is that the mats can be rolled up for easy removal. Once the purpose of removing the matting has been achieved, the mats are easily redeployed simply by unrolling.

As previously indicated, thin mats (approximately 0.25 inch) are required in order to achieve sufficient flexibility to allow practical rolling to be carried out. If the mats are too thick or inflexible the diameter of the rolls will be so large that the benefits of rolling up the matting will be lost. On the other hand, matting that is too thin or tends to have too great of volume in the perforations between the mat strips may not be suitable to prevent enlargement of the perforations and subject to penetration by high heeled shoes. Thus, while such matting may be easily rolled for removal and subsequent redeployment, the matting may be inferior with respect to creating a safe pathway for traffic. Also, matting that is not sufficiently robust may not provide particularly strong latitudinal and longitudinal connectors between mat sections so that the highly flexible matting may come apart unless bonded sufficiently with adhesive. The necessity of using adhesive is largely avoided by the robust mechanical properties of the latitudinal and longitudinal connectors (34,35) of the present invention.

Even with matting of optimum thickness (approximately 0.25 inch) and optimum perforation size (approximately 0.02–0.03 cubic inches) described with respect to various embodiments of the present invention, there are limitations as to how much matting can be included on one roll. Manipulations of the matting system of the present invention have indicated that an optimum size of approximately 12 feet in the longitudinal direction of traffic along the mat system. Thus, in another embodiment of the present invention, the mat system would be divided into 12 foot lengths, each having the same width as that of the overall mat system. Each of these 12 foot sections would each be contained within a separate roll of matting, and when deployed would be tied together with special connectors (as depicted in FIGS. 2(a)–2(d). Because of the size and difficulty inherent to handling 12 foot rolls of matting which are often of considerable width, connectors that are easy to lock and release are especially important. The connector of the present invention can be placed on one section of matting, which is placed on the floor and connected to another section of matting by simply pressing the second section of matting over the connector, preferably by stepping on them.

This is facilitated by easy-lock/release connector 40, depicted in FIGS. 2(a)–2(d). The connector is constituted by two support feet, 41, 42. These are connected together by a spacer bar 43 which divides the easy-lock/release connector into first and second halves, depicted as the right and left sides respectively of spacer bar 43 in FIG. 2(b).

Spacer bar 43 holds support feet 41, 42 together in a rigid spaced arrangement. The first half of the connector (right hand side of spacer bar 43) has two sets of upward protrusions 44. The second half (left side of space 43) has one set of upward protrusions. These are sized to fit snugly into the perforations between upper and lower strips 31,32. To do this, the upper protrusions 44 must be the same thickness or slightly less than an upper strip or rib 31. Since the thickness of the support feet 41,42 is the same as that of the lower strips or ribs, 32, the upper extending protrusions 44 will have upper surfaces that are approximately coplanar with the upper surfaces of the upper strips 31. Each set of upper protrusions for a single half are separated by the upper strips 31 when connected.

Figure 2C:
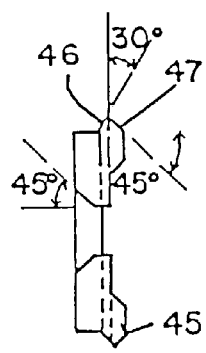
FIG. 2(c) is a end elevation view diagram depicting the structure of FIGS. 2(a) and 2(b).
Figure 2D:
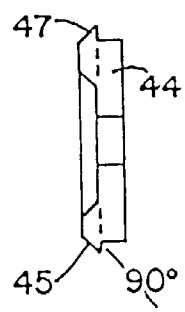
FIG. 2(d) is an end elevation view diagram depicting the different configuration that of FIG. 2(c).
Figure 2B:
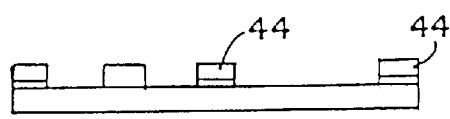
FIG. 2(b) is a side elevation view diagram of the structure of FIG. 2(a).
Figure 3A:
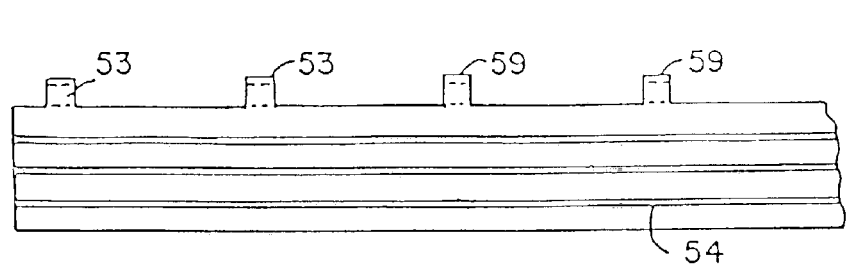
FIG. 3(a) is a top view diagram of a longitudinal ramp structure running along the length of the mat.
Figure 3B:
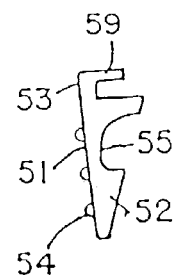
FIG. 3(b) is a side view diagram of the structure of FIG. 3(a).

Each of the upward protrusions 44 has an outwardly extending connection prong 45. Preferably, for the second half of connector 40 this prong is shaped as depicted in FIG. 2(c), having two surfaces 46 and 47, that extend outward, and over a lower strip or rib 32 when connecting to a mat section. The connecting prong is positioned with respect to the bottom of connector 40 so that the prong tightly fits over a lower rib 32 thereby creating a secure mechanical connection. As depicted in the embodiment of FIG. 2(c), connecting prong 34 extends approximately 0.062. inch over an adjacent lower strip of a mat section to which connector 40 is interfacing. However, this dimension is not necessary to practice the inventive easy-lock/release connector since the size of the connector can change as the size of the mat changes.

Upper surface 47 of connector 40 is preferably arranged at a 45° angle with respect to the horizontal (upper surface of both the connector 40 and associated upper strips 31). This allows an adjacent lower strips to easily slide by the connection prong 45 when connecting two mat sections together with connector 40. Connecting lower surface 46 is at an approximately 30° angle from horizontal. This angle, which can be anywhere from 30° to 45° serves to allow an easy release when the mat must be separated from the connector when both are being removed from the floor.

The easy connect and release arrangement on the second side (left hand side of spacer bar 43) of connector 40 is used to facilitate easy connection and removal of floor mat sections. Consequently, only one set of connecting prongs as configured in FIG. 2(*c*) is used. However, in an alternative arrangement two sets of upward protrusions 44 and connecting prongs 45 can be used. However, they must be configured to have slanted surfaces 46 and 47 as depicted in FIG. 2(*c*).

The first half of connector 40 (right hand side of spacer bar 43) is configured to have connection prongs 45 with the surfaces 46, 47 as depicted in FIG. 2(*d*). For easy assembly surface 47 is approximately 45° from horizontal, similar to that in FIG. 2(*c*). However, since the first half of connector 40 is meant to be a permanent attachment to it's mat section, the surface 46 is formed in a horizontal plane, or 90° with respect to vertical to more firmly hold the surface of the lower strips to which the connecting prong will be attached. Normally, the connecting prongs of the first half of connector 40 will be bonded to adjacent pieces of the mat section to which connector 40 is to be attached. This can be done by adhesive solvent bonding, or thermal welding.

In an alternate embodiment, the angled surfaces 46, 47 would be used on all the connection prongs 45 on both halves of the connector 40. This would allow the connector to be detachable from both adjacent mat sections rather than just one of them. This arrangement would allow the mat to be rolled more easily since the connector would not be extending from mat section at either end of the preferred 12 foot rolls.

The subject easy-lock/release connector 40 is sized to fit with the previously described mat system constituted by sections held together with the longitudinal and latitudinal connectors of FIGS. 2(*a*)–2(*d*). As such, connector 40 is approximately 3.125 inches long and approximately 1.165 inches wide. The total height of connector 40 is approximately 0.25 inches, the same height as the overall mat system. A change in the configuration of the mat would also cause the size of the connector 40 to change in order to maintain the proper fit within the perforations 33 of the mat.

The easy-lock/release connectors 40 are preferably applied between 12 foot segments (longitudinally) for the mat segments, and approximately every 2 foot along the width of the mat. However, longer or shorter lengths of mat can be connected together with connectors 40 and a greater or lesser frequency of these connectors can be deployed along the width of the mat while still practicing the present invention. The selection of connector density and mat segment length will ultimately depend upon the exact environmental features and the level of safety that is sought commensurate with those conditions.

Easy-lock/release connector 40 can be made from a material more rigid than that of the matting. Materials such as hardened rubber, and plastic are all appropriate. However, the connector 40 is preferably made of material having the same rigidity as that of the matting while still maintaining the functionality of this embodiment of the present invention. When the easy-lock/release connector is molded as part of a mat section (in the same manner as the previously discussed longitudinal and latitudinal connectors, 34 and 35, respectively), the easy-lock/release connector can be used in place of longitudinal connector 34. While the mechanical stress-connection arrangement of longitudinal connector 34 is not present in longitudinal connector 40, permanent bonding between mat sections can be achieved by adhesive, solvent bonding, and any other means known to skilled practitioners of plastic manipulation. Since compression of the support feet (41,42) of connector 40 is not necessary to make the connection for reasons previously described, connection between mat sections can be facilitated without turning over the mat, and without resort to compressing tools such as plyers. Effective, stress-free mechanical connection can be facilitated using just the connecting prongs 44 by pressing an adjacent mat section over the prongs. Thus, installation becomes relatively easy. If permanent connection between mat sections is desired, the end of connector 40 which is not molded as part of a mat section can be connected to an adjacent mat section using adhesive, solvent bonding or some other technique. Consequently, this embodiment of connector 40 should be considered the preferred embodiment.

FIGS. 3(*a*), 3(*b*), and 4(*a*)–4(*d*) depict longitudinal and latitudinal peripheral ramp structures. Both the latitudinal and longitudinal ramps have slopes to make the transition from the top of the mat (approximately 0.25 inch) down to the floor supporting the mat over a length of approximately 0.9 inch. These dimensions are representative only and can be altered accordingly for thicker or thinner mats.

Longitudinal ramp 50 extends along the longitudinal side edges of the mat system and runs the entire length of the mat. The sloping surface 51 has a number of ridges 54 running along the entire length of the ramp to enhance traction for those walking over the ramp. The bottom surface 52 is placed on the floor supporting the mat system, and additional holding capacity (with the floor) is provided by an approximately semicircular concavity 55 running along the length of the ramp 50. The ramp structure is held to the edge of the mat by means of connecting protrusions 53.

In the preferred embodiment connecting protrusions 53 fit snugly on each side of a single upper strip or rib 31 of the edge of the mat while each of the connecting protrusions is arranged over the lower strip 32 running along the longitudinal edge of the mat. The first connecting protrusion is separated from the first connecting protrusion by approximately 1.5 inch (from center line to center line). Each of the connecting protrusions is approximately 0.22 inch in length and approximately 0.2 inch in width. The space between the center lines of each connecting protrusion in a pair is approximately 0.5 inch.

Extending vertically from connecting protrusion 53 is a hook structure 59. This is arranged to fit snugly on the opposite face of a lower strip 32 which lies adjacent to ramp 50. The hook extends far enough to encompass most of the thickness of one of the lower ribs or strips to form a snug fit. Thus, the ramp can firmly but detachably connect to the lateral edge of a mat.

Preferably, ramp 50 is additionally connected to the longitudinal edges of the mat by bonding the connecting protrusions 53 with adhesive. When being applied to lengths of matting, the longitudinal ramp can be cut to length using either a flat or miter cut.

FIG. 4(a) depicts a latitudinal ramp 60 having a connection prong 63 to connect to an adjacent section of the mat. Otherwise, this ramp is virtually identical to the longitudinal ramp 50. As depicted in FIG. 4(c), connection prong or protrusion 63 extends beneath the adjacent upper strip 31 and lies in a notch of abutting ends of lower strips 32. Space for the protrusion is provided at the ends of the abutting lower strips by way of a notches 67 cut into the lower half of the thickness of the lower strips. Preferably, the notches are formed as part of the overall mat section molding process. Since the notch is formed in all of the mat peripheries, it is necessary that it be relatively thin (approximately ½ the thickness of the lower strip) in order to avoid undermining the structural integrity of the mat.

As with the longitudinal ramp, the preferred method securing the latitudinal ramp to the edges of the mat is by bonding the connecting protrusion to the mat with adhesive.

FIG. 4 (d) depicts the arrangement of notch 66 when formed with either a lateral or longitudinal connector 34, 35. The notch is formed behind the connector so no part of the material constituting the connector is removed in the formation of the notch. If a ramp is to be applied to that particular surface, the connector is cut away from the rest of the mat section exposing the notch for easy fitting by the protrusion 63 of the ramp. In this manner, the connector is not compromised by the formation of notch 66.

A space, 55,65 is formed on each of the longitudinal and latitudinal peripheral mats 50, 60, respectively. The space 55, 65 is preferably formed in the shape of a semicircle, and permits either of the ramp structures to flex when weight is applied directly to the ramp. This allows the ramp to more firmly grip the floor supporting it, and greatly decreases the tendency of the bottom edge of the ramp to curl up. At the edge of both types of ramp section 50,60, where two ramp sections abut each other, the spaces 55, 65 can be filled with short pieces of solid semicircular material 75 to serve as connectors between the two adjoining ramp sections. These stabilize the connection between ramp sections, providing both support and limiting curling of the lower or outer ramp edges. The connectors can be pressure fit into the cavities or can be bonded to the cavities with adhesive or solvent. When a miter joint is used between a longitudinal ramp 50 and a latitudinal ramp 60, as depicted in FIG. 5 a specially configured connector 76 can be inserted into the cavities 55,65 where they adjoin each other. Such connectors can be formed in the shape of the miter joint created by the inner section of the ramp sections 50,60. In the alternative, the connecting piece can be flexible so as to molded into the shape of the miter connection between the two spaces 55, 65.

Figure 6:
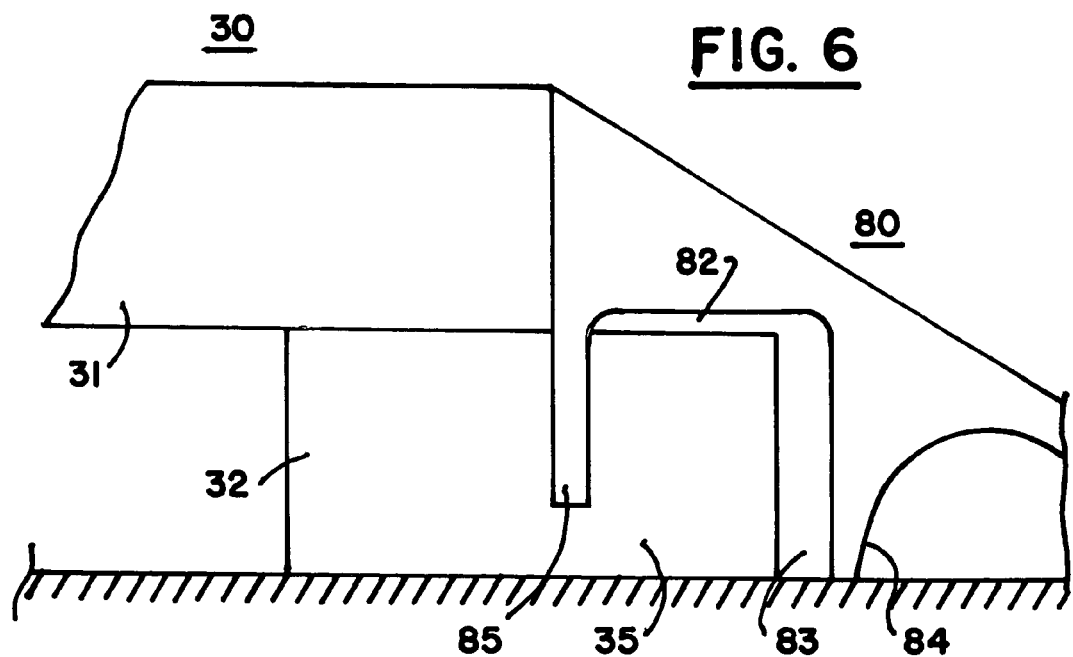
FIG. 6 is a side view depicting the interface between a mat section and the longitudinal ramp constituting an additional embodiment of the present invention.

When a miter cut of longitudinal ramp 50 is made, it must match a similar cut made on a latitudinal ramp 60, as that depicted in FIG. 5. The latitudinal ramp 60 is arranged very much like the longitudinal ramp 50. The respective spaces 55 and 60 of the longitudinal and latitudinal ramps are arranged so that they will align with each other as depicted in FIG. 6. The joint 70 between the two types of ramp can be better secured by the placement of a solid connecting plug 76 in both spaces 55, 65 so as to overlap the junction between the two types of ramps. The crucial factor to this arrangement is that both spaces 55, 65 be of the same size and shape so that a support piece such as plug 76 can be placed between the two.

The aforementioned embodiments of the present invention are preferably combined into an overall floor mat system. Since such systems require a great deal of flexibility, all the variations previously mentioned can be employed at the discretion of the mat installer, and as indicated by the particular environment. The previously described latitudinal and longitudinal connectors 34,35, because of the versatility of the aforementioned system, can be arranged in any fashion deemed suitable by the installer. Such arrangements can include mat sections with connectors on all four edges, as well as mat sections without any connectors at all. These mat sections are connected entirely by the connectors of adjacent mat sections. The individual 2 foot by 2 foot sections can be permanently bonded to each other through the use of adhesive as well as the aforementioned longitudinal and latitudinal connectors. The overall mat is preferably divided in 12 foot sections along its longitudinal direction of travel. Such lengths are easily rolled up for easy removal and deployment. The mats can be handled in this manner because they are preferably 0.25 inch in thickness. The matting is arranged to stop enlargement of perforations 33 and subsequent penetration by high heeled shoes by virtue of maintaining a particular volume of 0.02–0.03 cubic inches for the perforations.

There are additional problems that occur even with the matting of the aforementioned embodiments of the present invention. In particular, variations in size over long lengths of floor matting can cause problems in the alignment and fitting of the mat. There are also serious problems caused by warping or dimpling along the length of the mat. These problems can be minimized through the use of a modification of the aforementioned longitudinal ramp. This modification is depicted in FIG. 6.

As depicted in FIG. 6 longitudinal ramp 80 is attached along the side of mat section 30. This mat section contains upper ribs 31, which are arranged perpendicular to the flow of traffic over the mat section, and lower ribs 32 which are arranged parallel to the direction of travel over the mat section. A connecting extension 35 extends latitudinally from the edge of the mat and fits underneath the longitudinal ramp in cavity 82. This connecting extension can be constituted by a lower rib 32 without upper rib structures attached to it. Rather, the connecting extension/rib 35 can be connected to adjacent lower ribs 32 by means of the connecting structures with lower surfaces arranged in the same plane as the lower surfaces of lower ribs 32.

Extension arm 85 of ramp 80 fits between lower rib 32 and connecting extension 35. As a result ramp 80 is mechanically held to mat section 30. It should be noted that connecting extension 35 does not fill the entirety of cavity 82 but leaves a small air space 83. The presence of this air space allows leg 84 to flex thereby obtaining a firmer grip on the floor. As a result, there is less shifting and warping of the mat section 30, even over long mat lengths. Preferably, glue is applied to connecting extension 352 to hold it firmly to ramp 80, within cavity 82. While the glue is not entirely necessary, it can be used merely to form a more secure unit that has less tendency to shift. Without the glue, the integrity of air space 83 can be compromised by the shifting of the longitudinal ramp 80 on connecting extension 35. Consequently, the use of glue is preferable for this embodiment.

The connecting extension 35 need not extend along the entire length of the mat section 30. Rather, extension 35 can be composed of a plurality of different structures having the cross section depicted in FIG. 6. This flexibility is provided by the fact that extension arm 85 extends for the entire length of longitudinal ramp 80 so connection between the ramp and the mat section can take place anywhere along the length of the ramp. As previously described, the permanent bond is best provided by gluing the various connecting extensions 35 to extension arm 85.

In this particular embodiment the longitudinal ramp 80 is still connected to a latitudinal ramp along a mitered seam, as shown in FIG. 5. However, with the embodiment of FIG. 6, the latitudinal ramp 80 extends somewhat forward of the latitudinal edge of section 30. As a result, the latitudinal ramp that interfaces with longitudinal ramp 80 will be smaller than that in FIG. 5. Further, the miter seam 70 between the two ramps will no longer be at a 45° angle. Rather, the seam will be adjusted for the longer length of longitudinal ramp 80, along with the reduced width of latitudinal ramp interfacing thereto. No other changes in the latitudinal ramps as shown in previous embodiments of this invention is necessitated by the use of the FIG. 6 embodiment.

Another problem exists with the thin mats of the aforementioned preferred embodiments of the present invention, especially with small, light mat sections. Even with all of the aforementioned improvements, the mat sections tend to slide, especially on slick, vinyl floors, such as those found in retail outlets. This problem is addressed by another preferred embodiment, the use of relatively soft lower ribs 32. Accordingly, this embodiment requires that the floor mat be made of at least two different types of material.

Such a product can be manufactured using a modified injection molding process. The process takes place in two steps. First, the plastic material of the upper ribs is injected into the mold, filling only the lower part of the mold. Then, similar material is injected into the upper part of the mold while the material in the lower part is still molten. The material going into the upper portion of the mold is virtually the same as that in the lower portion. However, the material in the upper portion has been provided with an additive that causes that material to remain relatively softer than the material originally placed in the mold. The result is a floor mat of a dual durometer material.

The resulting product has upper ribs that are relatively hard while the lower ribs are relatively soft, even though the overall mat is made out of one material. The use of dual durometer materials to constitute mat 30 can be applied to any of the aforementioned preferred embodiments of the present invention to obtain mats less prone to slip on slick surfaces. The softer material can have a durometer in the range of 60–87. The harder material for the upper ribs can be in the range of 93–97. However, while these are suggested values, hardness of either material can be selected outside of these ranges whenever appropriate. For example, a material substantially harder than a 95 durometer could be used for the upper ribs or part of the upper ribs, or on selected upper ribs. The concept of the present invention is such that harder and softer materials can be used where ever appropriate on the mat system. A number of variations in the use of dual durometer materials are provided infra.

The use of the aforementioned dual durometer concept can be carried out in a number of arrangements. For example, ramp 80 in FIG. 6 can be constructed so that flexible leg 84 is formed of softer material, such as an 85 durometer material while the rest of the ramp is made of harder material, such as a 93 durometer material. This is not the only dual durometer arrangement that can be used for a ramp system. For example, the extension arm 85 of ramp 80 can also be made of a softer material to better grip within connector 35 and lower rib 32 of mat section 30. Likewise, the lower portion of the ramp 62 (FIG. 4(*b*)) can also be made of a softer material than the upper portion of the ramp. Connectors 35 can be made of a lower durometer material, such as an 85 durometer material in order to effect a better connection with extension arm 85 of ramp 80. It has been discovered that the connection between two softer materials is often more efficacious than a connection between a harder material and a softer material. Accordingly, the entire ramp can be made of material that is softer than that of the upper strips. The ramp material can be uniformly soft or dual durometer.

Such structures can be assembled in a number of different ways. For example, there are a number of well-known injection molding techniques that permit two types of material to be used in the plastic injection molding process. One approach would include forming a partial ramp of a higher durometer material to constitute the upper portion of the ramp while the dual injection molding process would be configured so that a softer material would be used to compose the rest of the ramp, constituting a bottom portion that interfaces with the surface which supports mat 30. While the dual injection molding process can be used to create dual durometer structures, other techniques can also be used. For example, the upper and lower ribs 31, 32, can be connected to each other by means of radio frequency welding, induction welding, or ultrasonic bonding. Likewise, connectors 35 can be connected to mat section 30 in the same manner, as well as being molded as part of the mat section.

Even though the dual durometer nature of the ramps, such as 80 in FIG. 6, provide a more stable hold of the mat system on its supporting surface, there are still a number of deficiencies occurring in the mat system of FIGS. 1-6. In particular, the stresses on the mat system tend to be manifested more greatly on both the lateral and longitudinal ramps. In particular, the miter seam 70 between the longitudinal and latitudinal ramps has a tendency to fail even though the rest of the mat system remains stable. The miter joint of FIG. 5, whether at a 45° angle or some other angle has a tendency to separate when the mat system which is surrounded by the ramp is under a great deal of stress. This is true even if the miter joint 70 is glued, heat welded, or even supported by a support piece, such as plug 76, as depicted in FIG. 5.

Figure 7:
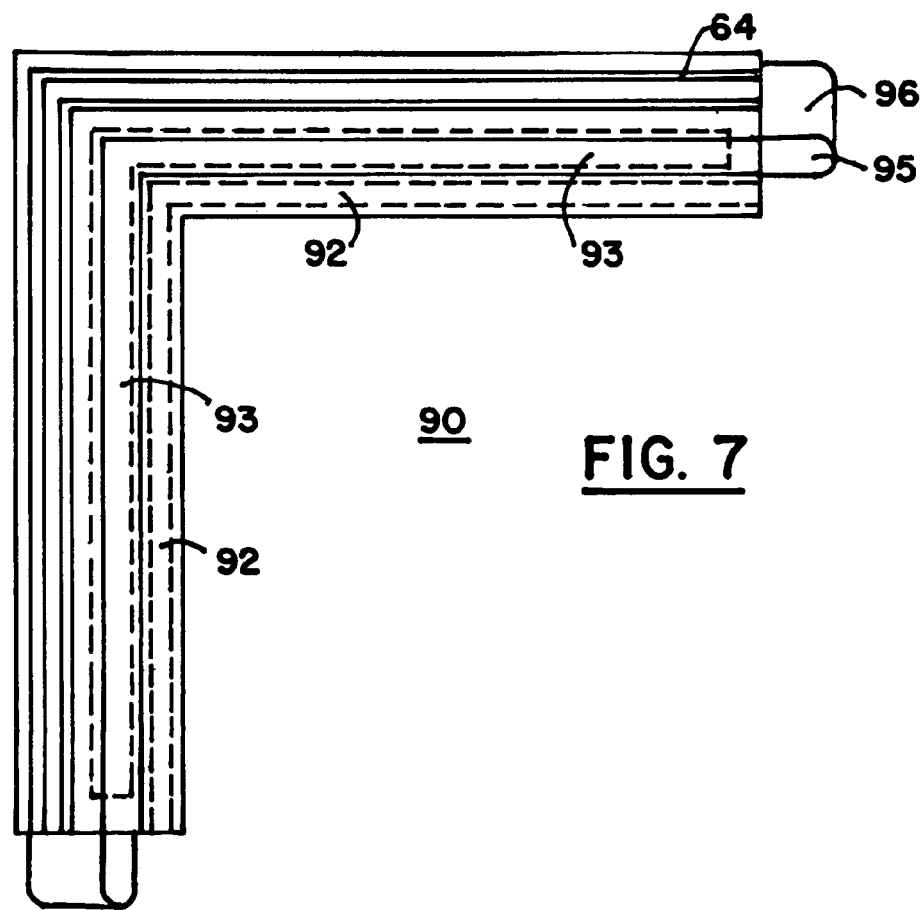
FIG. 7 is a top view of another embodiment encompassing both lateral and longitudinal ramp structures.

This drawback is addressed by the ramp structure depicted in FIG. 7. This structure is formed of a solid piece of plastic so there is no split between ramp sections along the miter joint 70, as depicted in FIG. 5. Consequently, the structure of FIG. 7 will not separate at this particularly vulnerable point. The connection to other ramp sections is made using connecting plug 95 and floor extension 96. This structure is injection molded as part of the overall ramp corner section 90. The connecting plug 95 slips into a concavity 93 of an adjacent ramp section (not shown) in a manner similar to that described for the embodiment of FIG. 5. However, the bond between adjacent ramp sections is much stronger since the connecting plug 95 is already molded into one of the ramp sections so that the gluing or heat welding process need be carried out only for the second ramp section (not shown).

The ramp corner section 90 is constructed with a cross section similar to that depicted in FIGS. 3(*b*) and 8, containing all of the upper structural characteristics of those ramps, and differing only in the bottom portion structure.

This bottom portion structure is best depicted in FIGS. 8(*a*) and 8(*b*). FIG. 8(*a*) depicts the side view of the ramp corner structure 90 while FIG. 8(*b*) depicts the cross section as viewed into a cut made along line A—A. The connecting plug 95 can be placed into concavity 93 of an adjacent mat ramp section in a manner similar to that depicted in FIG. 5. Floor piece 96 can slip under the bottom 98 of an adjacent ramp section. These pieces can be glued into place, or heat welded or solvent bonded to hold the adjacent ramp sections together. The ramp section 90 is held to adjacent mat sections 30 through use of connection arm 97 which fits over ramp connectors 34 or 35 of the adjacent mat section (depicted in FIG. 10). The ramp section 90 can be held to an adjacent mat section through the friction fit of connecting arm 97 or by gluing, heat welding or solvent bonding.

It should be noted that because both longitudinal and latitudinal ramp structures are identical, they will be interfacing with identical ramp connectors 34,35 on adjacent mat sections. An example of such connectors is depicted in FIG. 10(*a*) which is a top view of a typical mat section which would be bordered by the ramp corner section 90 of FIG. 7. Each of the longitudinal and lateral ramp connectors 34, 35 are of the same size and so will fit into concavity 92 of an adjacent mat section 90.

The top of the ramp 90 is virtually identical to that depicted in FIGS. 3(*a*), 4(*a*), 4(*b*) and 4(*c*), including treads 64. As would be normal with most mat systems, the upper portion of the ramp corner section 90 is made of a harder material (such as 93 durometer) in order to take the wear of the traffic that will travel over the mat system. As previously discussed, the bottom surface 98 of the ramp 90 can be of a much softer material (such as 85 durometer) than the upper surface of the mat which contains treads 64. Even if surface 98 is not of softer material, a great deal of holding power and stability can be obtained by making holding leg 94 out of a softer material. The holding leg 94 can be manufactured by the previously-discussed double injection system which is already well-known in this art. In the alternative, holding leg 94 can be added to a previously molded ramp, and connected by means of glue, solvent bonding or heat welding.

A key advantage of the embodiment depicted in FIGS. 7 and 10(*a*) is that longitudinal and latitudinal ramp connectors 34, 35 are the same. This simplifies manufacturing of both the mat sections and ramp sections. The mat corner section 90 of FIG. 10(*a*) depicts the type of construction used for mat sections at both the latitudinal and longitudinal peripheries. This particular structure is only necessary at the periphery of the mat system where a ramp (such as corner section 90) will be connected at either longitudinal or latitudinal edge of the ramp structure. This particular mat section 30 in FIG. 10(*a*) is the configuration requiring the ramp section 90 of FIG. 7.

It should be noted that the elements in FIG. 10(*a*) correspond to those of FIG. 1(*a*) with regard to the upper and lower strips 31, 32. However, there are a number of differences between the embodiment of FIG. 10(*a*) and that of FIG. 1(*a*). In particular, the longitudinal and latitudinal connectors 34, 35 of FIG. 1 are designed primarily for connecting to adjacent mat sections. In contrast, the longitudinal connectors 34, 35 in FIG. 10(*a*) refers to connectors that are dedicated for connecting to ramp sections such as 90. Also, for each lower strip 32, there is a longitudinal connector 35 aligned therewith. Likewise, for each upper strip 31, there is a latitudinal ramp connector 35 aligned therewith.

The outermost upper strip 31 and lower strip 32 have much less width than the normal upper and lower strips 31,32. This has been done as a manufacturing convenience that will allow mat sections to all be manufactured with a complete set of longitudinal and latitudinal ramp connectors which are easily removed for mat sections that do no border on the exterior edges of the mat system. Such mat sections 30 are connected together in a variety of different manners, using a variety of connectors, such as those described in U.S. Pat. No. 3,703,052 to Kessler.

It should also be noted that while a ramp connector 34, 35 extends from each strip 31,32, this is not a requirement for this particular embodiment of the present invention. Rather, ramp connectors can be extended from every other strip, both upper and lower. However, this alternative is also only one additional possible arrangement. Almost any configuration of latitudinal and longitudinal ramp connectors, as shown in FIG. 10(*a*), can be used as long as sufficient ramp connectors are provided to hold the ramp sections to the mat sections.

FIG. 10(*b*) is a side view taken in the direction of vector (A) from FIG. 10(*a*) of the mat system depicted in FIG. 10(*a*). Each of the latitudinal ramp connectors 35 is depicted as extending from an upper strip 31 and offset therefrom by the thickness of the upper strip so that each of the connectors is on the same plane as the lower strips 32. In this embodiment, the ramp connectors 35 are approximately the same thickness as the lower strips, and are joined to the lower strips by an extension 351 (similar to that of FIG. 1(*a*)). The connecting extension 351 of ramp connector 35 is configured so that it is of less thickness than the ramp connector 35. As a result, an extension of the ramp 97 (FIGS. 8(*a*) and 8(*b*)) is able to be placed into a gap between ramp connector 35 and the adjacent lower strip 31.

The longitudinal end of the mat section 30 is provided with a smaller upper end strip 311. End strip 311 is approximately ⅛ inch thick, the same thickness as the other upper strips 31. However, the end strip is only approximately ⅛ inch wide, as compared to over ¼ inch for the rest of the upper strips 31. This arrangement is made so that easier connections can be made between mat segments 30. In such an arrangement, end strip 311 would abut a similar end strip of an adjacent mat section so as to form the equivalent of a full upper strip 31 such as those disclosed in the previously cited U.S. Pat. No. 3,703,052 to Kessler.

The same situation exists with the latitudinal end of mat section 30. A thin lower strip 320 is provided to have a structure similar to that of upper end strip 311. The lateral connection between adjacent mats entails abutting lower end strips 320 from the two adjacent mat sections against each other. External lateral connectors are used to hold the two mat sections 30 together in a lateral direction. Examples of lateral connectors are found in the previously cited U.S. Pat. No. 3,703,052 to Kessler.

The preferred method for connecting adjacent mat sections 30 to each other in the latitudinal and longitudinal directions is to remove the connectors 34, 35 while retaining both the lower and upper edge strips 311 and 322. For this arrangement separate connectors must be used. Conventional longitudinal and latitudinal connectors, such as those depicted in FIGS. 4 and 13 of U.S. Pat. No. 3,703,052 to Kessler can be used with the mat arrangement of the present invention.

FIG. 10(*c*) depicts a side view of the mat section 30 depicted in FIG. 10(*a*) taken from the direction of vector (B). The side view of FIG. 10(*c*) emphasizes an additional structure and an additional embodiment of the inventive mat system. Auxiliary support 100 is mounted or otherwise formed on the bottom of the upper strips 31, and arranged as shown in FIG. 9(*a*) and FIG. 10(*a*) to be spaced between each of the lower strips 32. The auxiliary supports 100 are used to provide additional support to the overall mat section 30 by preventing flexing of the mat beyond a certain predetermined point.

For example, the auxiliary supports 100 may extend to be even with the bottom of the lower strips 34 so as to provide maximum support or rigidity to the mat, thereby preventing flexing of the mat. This arrangement provides all the advantages of additional lower strips or closer spacing without the weight, stiffness, decreased moisture and particulate migration beneath the mat, or any other drawbacks of additional lower strips.

In a typical arrangement, such as that on FIG. 10(c), which depicts a mat having a maximum in support, the auxiliary support structures 100 extend for the full thickness of lower strips 32. The auxiliary supports are in the form of truncated cones. This arrangement permits easy manufacture, as well as easy migration of fluids beneath the mat section between the lower strips 32. Preferably, the auxiliary supports are formed of the same material as the rest of the mat section 30.

The sizes for a typical mat system, as manufactured in accordance with the present invention, requires upper strips 31 be arranged in parallel with each other and that the lower strips 32 be arranged in parallel with each other. The spacing between the upper strips is approximately 3/16 of an inch while the spacing between the lower strips is approximately 7/16 of an inch. Both lower strips and upper strips are 1/4 inch wide and 1/16 inch deep. Both the longitudinal and latitudinal ramp connectors 34, 35 extend from the mat using extension arms 351, 349 which are approximately 1/4 inch wide and 1/16 inch thick. The winged portion 352, 348 of the ramp connectors is approximately 7/16 inch wide. The auxiliary connectors (as depicted in FIG. 10(c)) are approximately 1/8 inch thick. The cylinder has a diameter of approximately 1/4 inch at the base (nearest to the bottom of upper strip 31) and a diameter of approximately 3/16 inch at the bottom which interfaces with the support surface. The size of the mat sections 30 is preferably two foot by two foot. However, larger mat sections, such as four foot by eight foot, are also encompassed using the structure of the present invention.

The aforementioned sizes were provided for a 1/4 inch flexible mat system. However, the inventive concepts can be applied to thicker mat system such as 1/2 inch. Further, the sizes provided were only exemplary of a particular product being prepared for market. Accordingly, there may be substantial changes in the aforementioned sizes while remaining within the confines of the present invention.

A greater extent of flexibility may be required of mat sections besides that configured for FIG. 10(c). Such a variation is depicted in FIG. 9(b). This is an interior mat section, without integrated longitudinal and latitudinal ramp connectors 34,35. For an interior mat section 30, only the end strips 320 and 311 are formed for connection to adjacent mat sections. If the mat sections 30 have been manufactured with the ramp connectors 34, 35, these structures would be cut away from interior mat sections to facilitate installation.

In this embodiment, auxiliary supports 100 are only approximately 1/2 the thickness of the lower strips 32. This permits extra movement of the mat to deform before the auxiliary support makes contact with the ground to prevent further deformation of the mat. This additional flexibility in the mat permits easier installation and of movement for adjustment purposes. Mat sections with the shorter auxiliary support structures may also be easier to manufacture and prepare for shipment. Also, the flexing of the mat can help it grip the floor better under some circumstances, thereby providing a more stable and thus, safer mat system.

It should be noted that an extremely dense, and impenetrable structure has its own advantages and drawbacks. Along with the increased stability, such structures can be difficult to deploy and remove. Further, small spaces between the strips may not permit sufficient passage for moisture and particulate material through the mat, or between the lower strips along the surface supporting the mat. Consequently, greater spacing between the ribs of the mat, such as that described earlier in this application, may be preferred. A mat made to be inflexible may also have some problems gripping the surface that is supposed to support the mat.

To obtain greater stability and impenetrability, conventional safety floor mat systems have been provided with an increased number of both upper and lower strips 31, 32. This is done in those situations where maximum mat stiffness is required, even for a relatively thin mat such as a 1/4 inch configuration. Through long use and testing it has been discovered that there are minimum spacing requirements for such mats in order to permit proper migration of material from the top of the mat to the bottom of the mat, and to permit efficient flexibility so that the mat can be handled for installation and removal. In one embodiment a minimum spacing of 0.07 inches is required between the upper ribs 31, and a minimum of 0.1 inch spacing is required between the lower ribs 32. Accordingly, for this embodiment there is a limit to the density of the mat configuration for which stiffness and impenetrability are to be maximized. However, most of the preferred embodiments described herein use less dense rib arrangements.

In order to maintain a high level of impenetrability without maximizing mat configuration density, the aforementioned auxiliary supports 100, in the configuration of FIG. 10(a), provide a viable alternative. This arrangement can be enhanced through the use of dual durometer materials in the construction of the mat, especially those parts, such as the ramps, that must grip very firmly. However, there can be drawbacks when the entire lower rib structure 32 is made of a softer material than the upper ribs 31. One drawback is that flexibility increases. As a result, penetrability by either high heels or small wheeled vehicles becomes problematical. Accordingly, a balance must be found between the flexibility of the mat (and its greater gripping power on the supporting surface), and maintaining the integrity of the mat to prevent distortion and penetration. The balance between these factors is often determined based upon the precise use and location in which the mat is to be applied.

FIG. 9(b) best illustrates structures for achieving the necessary balance between penetration resistance and strong anti-slip characteristics for a mat structure. In this structure, lower ribs 32 are formed of a high durometer material (such as 93), the same as the upper ribs 31. However the lower ribs are not nearly as thick as the upper ribs. For example, the lower ribs can be formed to be only half the thickness (1/16 inch) as the upper ribs (1/8 inch). A lower portion 326 is formed onto the lower rib 32 to complete the normal thickness of the rib. This lower portion can be of a lower durometer material (such as 85). The lower portion is preferably formed as a rectangle since it has been determined that this particular shape provides the best gripping power for the subject floor mat system. The bottom portion 326 can be formed using a dual injection molding process already known in the conventional art. On the other hand, the lower portion 326 can be added by way of forming separate rectangular structures and bonding them to the bottom surface of lower ribs 332. This bonding can be carried out by means of glue, solvent bonding or heat welding.

Depending upon the amount of gripping power needed other shapes for both the lower section 326 or the lower ribs 332 can be formed. For example, one configuration would be the use of alternating lower ribs formed as rectangles while every other lower rib would be formed in a semicylindrical shape. Only the rectangular-shaped lower ribs 32 need be formed of the lower durometer (softer) material, or have the addition of the lower section 326 formed of a softer material. It should be understood that the variations encompassed by the present invention can be any that would best fit a particular environment or use of a floor mat system. Consequently, virtually any combination of shapes and materials can be used for the lower ribs 32 and any additions to these ribs such as lower section 326.

One variation that is relatively simple, and thus appropriate for retrofitting existing floor mats employs the operation of creating a split in the bottom of the lower strips 32. Within this split, the softer material can be inserted. The softer material will then deform, being forced partially back into the split in the strip, and provide a strong grip on the surface supporting the mat. The result will be a relatively stiff structure with good gripping power.

Another variation, as depicted in FIG. 9(*b*), is the modification of auxiliary supports 100. These supports can be shortened to approximately ½ the length (¹⁄₁₆ inch) of the lower strips 32. Then the rest of the length can be added in the form of a soft extension 101 to achieve the same, or even greater, thickness as the lower strips. The softer material in extension 101 will compress more easily than lower strips 32 (when the lower strips are formed of a higher durometer material). This compression of extension 101 will provide a certain flexibility to the mat. The flexibility can be adjusted by adjusting the length of extension 101. For example, if extension 101 is made to have a slightly greater height than lower strips 32, a greater amount of compression will take place with less deformation of the mat. This will also provide a very secure grip on the surface supporting the mat. Further gripping power can also be provided by forming lower sections 326 on the lower strips 32, either on every lower strip or in an alternating pattern. Depending upon the flexibility and the gripping power required, an arrangement can be provided whereby the lower ribs 32 are provided with lower sections 326 of soft material while the auxiliary support structures 100 are slightly shorter than the entire height of ribs 32 and lower section 326 so that the flexibility is limited by the hard material of auxiliary support 100.

Another arrangement is to form the extension 101 on auxiliary support 100 to have a concave structure 102 made of a softer or lower durometer material. The concave structure will act as a suction device when the mat is pressed against the surface supporting it. This will provide a superior gripping power for the overall mat arrangement. The concave section can be formed as part of the regular auxiliary support structure 100, either as a softer material or as a harder material. In the alternative, the concave structure 102 can be formed of a soft extension piece fitted to the bottom of the auxiliary support structures 100. This addition to the auxiliary support structures can be for all of them, half of them, or any number that is appropriate for the use and environment to which the floor mat is applied.

While the first group of preferred embodiments have been limited to parallel upper and lower strips where the upper strips are always at a right angle to the lower strips, other variations are possible using various concepts of the present invention. While one preferred embodiment of the present invention has equal spacing between both the upper and lower strips 31, 32, other spacing arrangements, such as those disclosed in U.S. Pat. No. 3,703,059 to Kessler, are feasible using the concepts of the present invention.

It should be noted that the spacing between strips does not have to be uniform. Further, while a parallel arrangement of the lower strips facilitates the drainage of liquid or other particulate matter under the mat, virtually any pattern can be used to facilitate such drainage. Also, the arrangement of the upper strips is not limited to a parallel arrangement perpendicular to the lateral edges of the mat. Rather, virtually any pattern can be used for the upper strips 31, as long as the mat provides safe footing to those using it and adequate pass-through for liquid and particulate matter.

Figure 11:
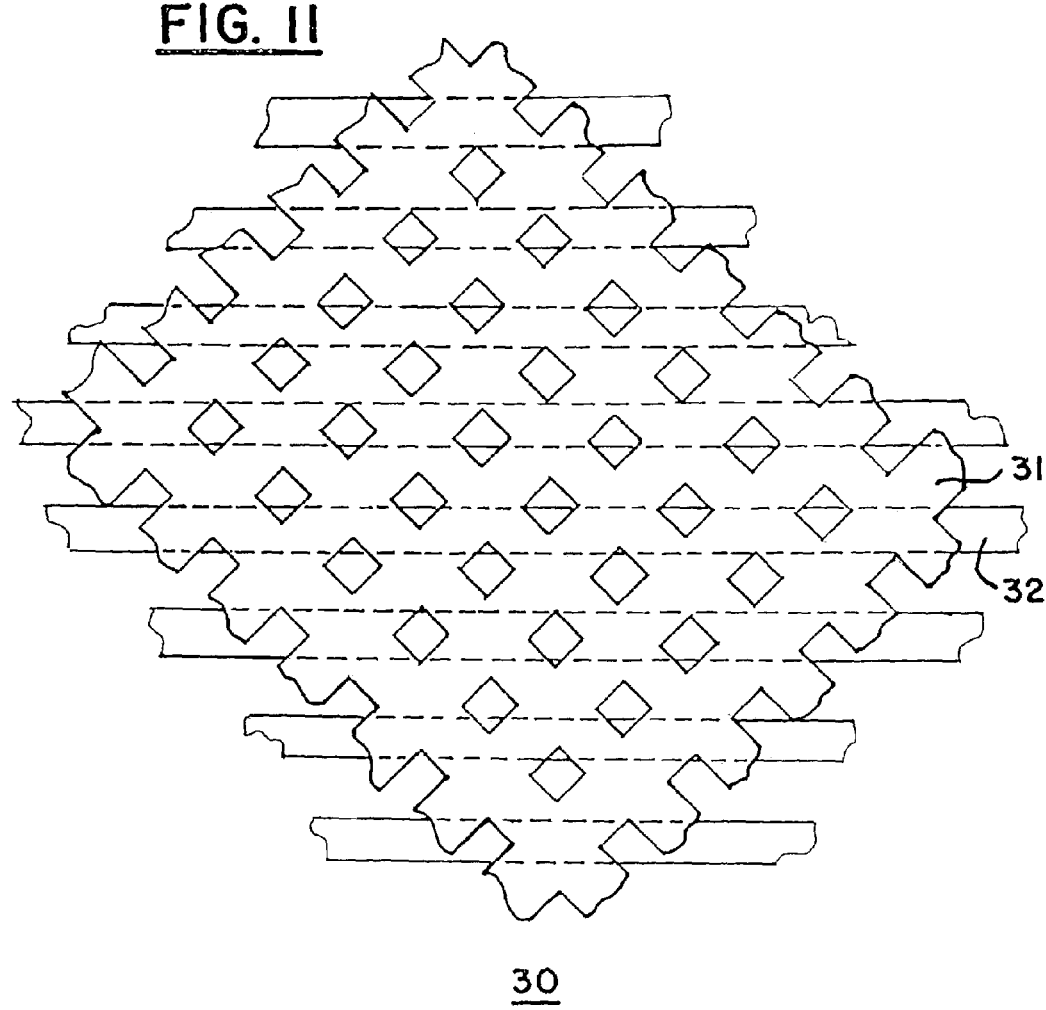
FIG. 11(a) is a top view of an alternative floor mat having non-parallel upper strips.

FIG. 11 depicts one pattern that can be used for the upper strips 31. However, any number of other patterns can also be used as long as they provide safe footing for those using the mat. It should be noted that all of the aforementioned concepts can be applied in some manner to floor mat systems in which the strips are not parallel or uniformly spaced from each other or are not in parallel, or are in any number of different configurations. For example, the dual durometer concept works equally well with strips that are not in parallel with each other or are not uniformly spaced from each other, or in any number of other patterns or configurations. Likewise, the corner ramp piece as depicted in FIG. 7 is effective in virtually any type of floor mat arrangement.

The use of dual durometer material can be extended to other aspects of the mat system. For example, the longitudinal and latitudinal connectors which are used to hold ramp sections 30 to each other can be of the softer material while the ramp section themselves are of a harder material. The previously cited examples of a 93 durometer material for the ramp section and an 85 durometer for the connectors can be used to carry out this aspect of the present invention. However, it should be understood that the present invention is not limited to these two examples of hardness for either the mat sections 30 or the longitudinal and latitudinal connectors. Further, the connectors can be of almost any type or configuration. Connectors that could be used for this aspect of the present invention are found in U.S. Pat. No. 3,703,059. Examples are the latitudinal connector of FIG. 4, longitudinal connector 12 in FIG. 1, and ramp connector 36 in FIG. 13, as well as any other connectors that would apply to the mat structure of U.S. Pat. No. 3,703,059 or the mat structure depicted in the present application.

One advantage with using softer material for the longitudinal connectors of the present application and U.S. Pat. No. 3,703,059 is that the softer material in such connectors is arranged along the support surface or floor beneath the mat structure. As a result, additional anti-slip or anti-skid properties are achieved through the use of these connectors. This is especially true for the elongated connectors that hold large mat segments together in the longitudinal direction. Additional anti-slip characteristics can be provided by forming longitudinal connectors 34 (FIGS. 1(*a*) and 1(*b*) of the present application) of a softer or lower durometer material. The placement of longitudinal connector 34, on the support surface or floor beneath the floor section 30, and especially the relatively large area of connector 34 provide excellent anti-skid properties. For some support surfaces the use of only longitudinal connectors made of the softer material (such as 85 durometer) will be sufficient to provide all the anti-skid properties necessary for the mat system.

Figure 12:
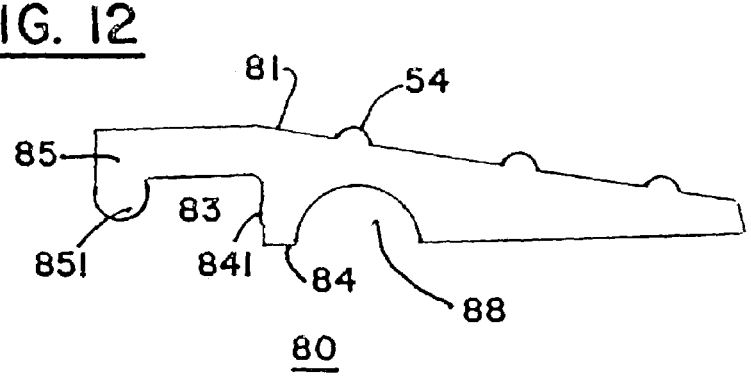
FIG. 12 is a side view of a refined ramp structure.

FIG. 12 depicts a ramp structure 80 which is similar to ramp 52 in FIG. 3(*b*). However, the structure of FIG. 12 is more highly developed, and is configured specifically to interface with connectors 34 and 35 as depicted in FIG. 10(*a*). It should be noted that the protrusions 54 are similar to those in the structure of 3(*b*), and are used as anti-slip treads. However, it should be noted that the upper surface 81 of ramp 80, as well as the protrusions 54 are made of a hard material (such as a 93–97 durometer material) while the lower structure is made of a softer material (anywhere from 60–87 durometer material). The lower structure includes extension arm 85, flexible leg 84. Likewise, the structure around concavity 88 is also formed of the lower durometer material. Rounded extension 851 and holding structure 841 are both used to better hold connectors 34 or 35. Preferably, structures 851 and 841 are made of a softer material so as to better interface with connectors 34 and 35. With structures 851 and 841 being made of relatively soft material the grip on connectors 34, 35 is even more greatly facilitated if the connectors 34, 35 are also made of a softer material.

Figure 13:
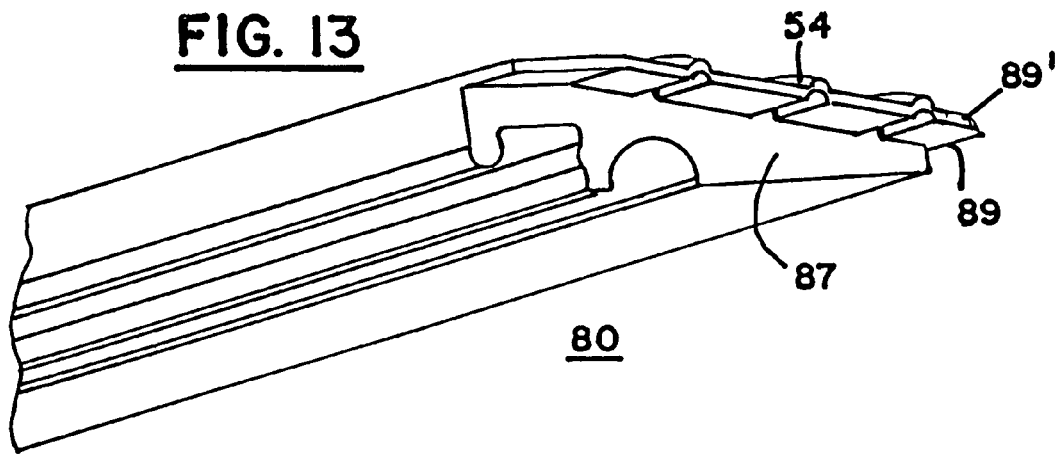
FIG. 13 is a perspective view of an additional embodiment of the ramp of FIG. 12.

FIG. 13 is a ramp structure having the same configuration as that of FIG. 12. However, an additional structure, connecting flap 89 has been added. This connecting flap contains the tread structures 54, as are present on the rest of the ramp section 80. Edge surface 87 of ramp section 80 butts against a complimentary surface on adjacent ramp section (not shown). Connecting flap 89 extends over the top surface of the adjacent ramp section so that any space between the two ramp sections is covered. Beveled portion 891 of connecting flap 89 reduces the chance of mishap by eliminating any kind of step structure that might be caught by traffic passing over the intersection between two ramp sections. In one preferred embodiment, connecting flap 89 is glued to the top surface 81 of an adjacent ramp section 80. The overlapping flap 89 prevents separation between two adjacent ramp sections forming a tight glued bond with the adjacent ramp section and covering any spaces that may be developed between the two adjacent ramp sections.

Connecting overlap 89 can also be formed of a softer material than the rest of the upper surface 81 of ramp section 80. This softer material (60–87 durometer) will also help facilitate a connection between adjacent ramp sections and easier conformity with the upper surface 81 of adjacent ramp section.

The dimensions for one such ramp structure that has been placed in use is one that has a connecting flap 89 ¼ inch wide and ¹⁄₁₆ inch thick. The bevel 891 reduces this thickness even further. The two adjacent ramp sections 80 can be better connected to each other through the use of a plug such as structure 95 (FIG. 7), which can extend between two ramp sections. When glued into place, the plug can hold the two ramp sections together by itself or can be used in conjunction with the connecting flap 89. In the alternative, in some cases, the connecting flap 89 is sufficient to hold the two ramp adjacent ramp sections together.

One advantage with this embodiment of the present invention is that the connecting flaps 89 can be added to existing mat systems. Like the previously-discussed anti-slip structures, existing mat systems can be modified using various bonding techniques to add the flaps, as well as the anti-slip structures. The techniques that can be used for doing this include: gluing; solvent bonding; heat welding; ultrasonic bonding; radio frequency welding and induction welding. Using these well-known techniques, the advantages of the present invention can be achieved for existing mat systems.

Even with all of the anti-skid or anti-slip structures previously described, there are circumstances under which a floor mat will be moved or distorted. For example, high speed traffic, such as electric carts, or extemely heavy traffic, such as vehicles used to transport materials in factories, will cause floor mats to distort or move. This can be particularly problematical on a concrete shop floor which might already be subjected to moisture or particular matter having a lubricating effect. In such circumstances, additional means are necessary to secure safety floor matting to the underlying surface.

A number of semi-permanent anchoring devices have been used conventionally. Unfortunately, these are awkward to install, and hinder the placement and removal of mat sections. Further, conventional floor connectors interrupt the continuity of the mats unless extensive cutting is done on the bottom layers of the mat to accommodate the floor connectors. Since conventional connectors are often of a very stiff material, when such connectors are arranged in an elongated form to hold together adjacent mat sections, there is another problem. When the mat is removed from the floor and rolled, as is very common with such arrangements, the stiff connectors often crack, or distort the mat.

Figure 14:
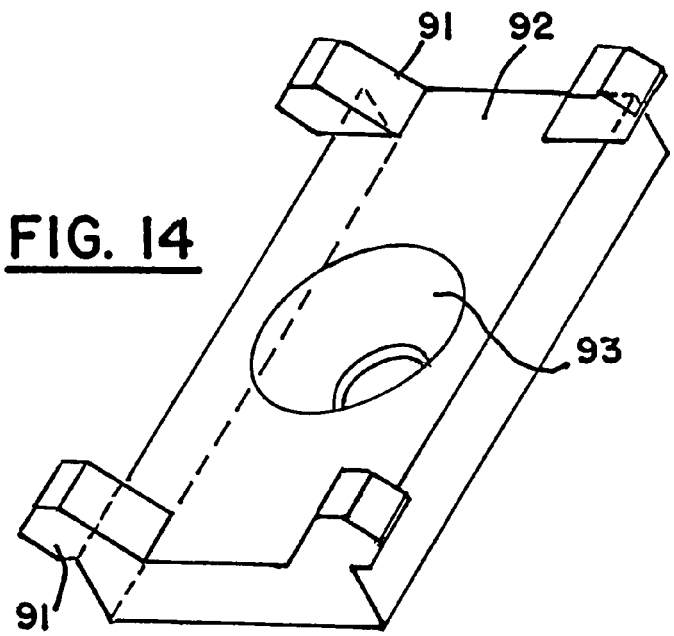
FIG. 14 is a perspective view of a floor connector that can be used with many embodiments of the mat system previously described.
Figure 15:
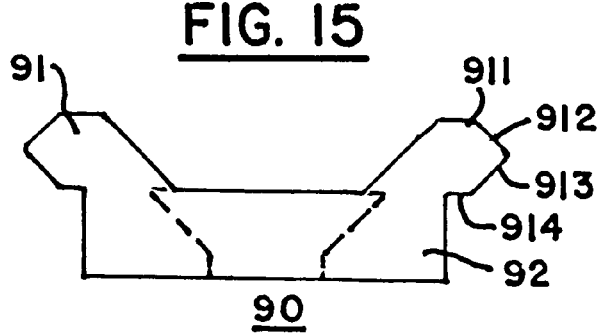
FIG. 15 is a side view of FIG. 14, depicting the configuration of the connecting wings.

A solution to all of these difficulties is found in the floor connector 90 depicted in FIG. 14. A key aspect of this device is that it is sized so as to fit between two lower ribs 32. Accordingly, the width of the main body 92 is sized so that it can fit between two lower ribs 32 without having to cut out any intervening ribs. This is in stark contrast to conventional arrangements. Accordingly, each of the connecting wings or dogs 91 will fit over a lower rib 32 to hold the mat and the floor connector 90 together. Floor connector 90 can be used to hold two mat sections together by virtue of one set of connecting wings fitting over the lower ribs 32 of a first mat section and a second set of connecting wings fitting over the lower ribs of an adjacent mat section. Floor connector 90 can be used only to connect adjacent mat sections together. On the other hand, floor connector 90 can be used to hold the connected mat sections to the floor. The floor connector 90 is connected to the floor via screw hole 93.

In order to make the best use of floor connector 90, it is preferably made of a lower durometer material, such as those in the range of 60–87 durometer. While using such a material to constitute floor connector 90, a firmer grip can be had on the attached mat section and an additional anti-skid or anti-slip structure is provided to that mat section, even when the floor connector 90 is not fastened to the floor using a screw or other conventional fastening means. It should be noted that the floor connector 90 need not utilize screw hole 93 as a means for attaching it to the floor. Rather, the floor connector can be glued to the floor, or attached by any means believed appropriate by the installer. Also, floor connector 90 can be fabricated from a hard material (such as that used for the upper mat strips) within the context of the present invention.

Attachment of floor connector 90 to a mat section is facilitated by beveled surface 912 which allows the mat section to be pushed over connecting wing 90 so that lower ribs 32 are held easily in place. This is normally done by simply stepping on the mat section, once it has been placed with respect to floor connector 90. By simply stepping on the mat section connecting wings 91 are pushed over the lower ribs 32. Likewise, beveled surface 913 permits easy removal of the mat section and detachment from floor connector 90 by allowing the lower rib 32 to slide along this surface. Horizontal surface 914 is relatively short, being configured only to hold lower ribs 32 in place until the mat is to be removed. Accordingly, detachment of the mat section from the floor connector 90 can occur easily even if the floor connector is not fastened to the floor or support surface underlying the mat.

Because floor connector 90 is made of a relatively soft material, it can used to connect two mat sections together (if the floor connector is not attached to the floor) when the mat system is being rolled up for removal and storage. With conventional connectors made of harder material, there is a tendency for the connectors to crack or otherwise fail. In contrast, the use of the softer material with the connectors of the present invention allow rolling to take place without any danger to the connector or the integrity of the overall mat structure.

Although a number of preferred embodiments have been disclosed by way of example, the present invention should not be construed or limited thereby. Rather, the present invention should be interpreted to include any variations, modifications, additions or other examples falling within the scope of the following claims.

We claim:

1. A mat system arranged on a support surface to provide a dry, relatively unencumbered travel surface, said mat system including at least one mat section, and comprising
   (a) a plurality of upper strips, said upper strips having upper and lower surfaces;
   (b) a plurality of lower strips, said lower strips having upper and lower surfaces arranged so that the upper surfaces of said lower strips are permanently affixed to said lower surfaces of said upper strips; and,
   (c) a ramp structure including a plurality of ramps arranged around at least part of a periphery of said at least one mat; said ramp structure being constituted of a material softer than material constituting said plurality of upper strips.

2. The matt system of claim 1, wherein said ramp structure comprises at least one corner piece joining at an intersection of two different ramps extending from two different edges of said at least one mat section, said corner of said ramp structure being constituted by a single unitary molded structure.

3. The mat system of claim 2, wherein said material constituting said plurality of upper strips has a durometer between 93 and 97, and said second material has a durometer between 60 and 87.

4. A mat system arranged on a support surface to provide a relatively dry unencumbered travel surface, said mat system including at least one mat section, each said mat section comprising
   (a) a plurality of upper strips, said upper strips having upper and lower surfaces; and,
   (b) a plurality of lower strips, said lower strips having upper and lower surfaces arranged so that said upper surfaces of said lower strips are permanently affixed to said lower surfaces of said upper strips; and
   (c) at least one connector, said at least one connector being constituted of a harder material than said lower strips.

5. The mat system of claim 4, wherein said at least one connector is formed separately from any of said at least one mat section.

6. The mat system of claim 5, wherein said at least one connector is attachable to a surface supporting said mat system.

7. The mat system of claim 5, comprising a plurality of said connectors formed as part of said at least one mat section.

8. The mat system of claim 7, wherein said connectors are formed from each lateral side of said mat section.

9. The mat system of claim 8, wherein said connectors are configured to attach to adjacent mat sections, interfacing with strips constituted by materials of a different hardness than said connectors.

10. The mat system of claim 8, wherein said connectors are arranged to connect two ramp sections adjacent said mat section.

11. The mat section of claim 10, where said ramp sections are constituted by softer material than said connectors.

* * * * *

UNITED STATES PATENT AND TRADEMARK OFFICE
CERTIFICATE OF CORRECTION

PATENT NO.         : 7,028,434 B2
APPLICATION NO. : 10/463043
DATED              : April 18, 2006
INVENTOR(S)        : Ronald Kessler, Myron Ullman and Kim D. Kendall It is certified that error appears in the above-identified patent and that said Letters Patent is hereby corrected as shown below:

On title page Item [73]
Assignee should be changed to read as follows:

Assignee:   R & J Marketing and Sales, Inc.
            1110 Thalia Ave.
            Youngstown, Ohio 44512

Signed and Sealed this

Seventeenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,028,434 B2
APPLICATION NO. : 10/463043
DATED : April 18, 2006
INVENTOR(S) : Ronald Kessler, Myron Ullman and Kim D. Kendall It is certified that error appears in the above-identified patent and that said Letters Patent is hereby corrected as shown below:

On title page Item [73]
Assignee should be changed to read as follows:

Assignee:  R & J Marketing and Sales, Inc.
1110 Thalia Ave.
Youngstown, Ohio 44512

Signed and Sealed this

Fourteenth Day of August, 2007

JON W. DUDAS
*Director of the United States Patent and Trademark Office*